United States Patent [19]

Minamino

[11] Patent Number: 5,787,395
[45] Date of Patent: Jul. 28, 1998

[54] WORD AND PATTERN RECOGNITION THROUGH OVERLAPPING HIERARCHICAL TREE DEFINED BY RELATIONAL FEATURES

[75] Inventor: Katsuki Minamino, Tokyo, Japan

[73] Assignee: Sony Corporation, Tokyo, Japan

[21] Appl. No.: 683,488

[22] Filed: Jul. 18, 1996

[30] Foreign Application Priority Data

Jul. 19, 1995 [JP] Japan ................................ 7-182851

[51] Int. Cl.⁶ .................................................. G10L 9/08
[52] U.S. Cl. ........................... 704/255; 704/245; 704/237
[58] Field of Search ........................... 395/2.54, 2.61, 395/2.65, 2.49, 2.09, 2.4, 2.45, 2.52, 2.59, 2.6, 2.64, 2.66, 2.46, 2.25, 2.26, 2.27, 2.72; 382/170

[56] References Cited

U.S. PATENT DOCUMENTS

| Re. 31,188 | 3/1983 | Pirz et al. ........................ 395/2.61 |
| 4,837,831 | 6/1989 | Gillick et al. ........................ 395/2.54 |
| 5,033,087 | 7/1991 | Bahl et al. ........................ 395/2.65 |
| 5,537,488 | 7/1996 | Menon et al. ........................ 382/170 |
| 5,546,499 | 8/1996 | Lynch et al. ........................ 395/2.49 |
| 5,621,859 | 4/1997 | Schwartz et al. ........................ 395/2.65 |

*Primary Examiner*—David R. Hudspeth
*Assistant Examiner*—Donald L. Storm
*Attorney, Agent, or Firm*—Frommer Lawrence & Haug LLP; William S. Frommer

[57] ABSTRACT

A voice recognizing method in which a plurality of voice recognition objective words are provided. Scores are accumulated for an unknown input voice signal as compared to the voice recognition objective words by using parameters which are calculated in advance. Upon receipt of an unknown voice signal, a corresponding voice recognition objective word is extracted and recognized. The voice recognition objective words are structured into an overlapping hierarchical structure by using correlation values between each pair of voice recognition objective words. This correlation may be computed from acoustic features, HMM parameters or the like. Score calculation is performed on the unknown input voice signal by using a dictionary of the voice recognition objective words structured in the hierarchical structure. Upon preliminary recognition, the dictionary of the voice recognition objective words is resorted without recalculation of the correlation values.

20 Claims, 8 Drawing Sheets

WORD AND PATTERN RECOGNITION THROUGH OVERLAPPING HIERARCHICAL TREE DEFINED BY RELATIONAL FEATURES

1. FIELD OF THE INVENTION

The present invention relates to a voice recognizing method, an information forming method, a voice recognizing apparatus, and a recording medium, more particularly, to a voice recognizing method and apparatus in which one word and a plurality of words are selected from a given dictionary with respect to an input voice signal, and to an information forming method for forming a dictionary and a recording medium on which a dictionary for voice recognition is recorded.

2. PRIOR ART

In the field of voice recognition for extracting language information from an input voice signal, a word corresponding to the input must be frequently selected from a given dictionary.

For example, in voice recognition for a place name, standard patterns are formed for place names serving as objective candidate words, and matching between a feature amount pattern obtained by analyzing an input voice signal and all the standard patterns is set, i.e., distance calculation is performed, to select a pattern which is most similar to the place name. This operation is performed in the same manner as described above when a probability model serving as a hidden markov model (HMM). An HMM is formed for each place name, and a model whose generation probability is highest with respect to an input voice signal must be selected.

In general voice recognition, distance calculation is performed to set matching between objective words and an input voice signal, or a generation probability is calculated by using the probability model of each word, thereby adding scores to all the words, respectively. On the basis of the scores, a word having the highest score is selected.

For example, in the HMM (Hidden Markov Model), probability models are formed for recognition objective words in advance, and a generation probability is calculated by a feature amount obtained by analyzing an unknown input voice signal. On the basis of the generation probability, scores are added to all the words. A word having the highest score is selected as a recognition result.

In this case, a high score corresponds to a short distance when a distance is used as a parameter, and a high score corresponds to a high probability when a generation probability is used as a parameter. In this manner, scores are used as expressions corresponding to evaluation values.

In a recognition system having a small vocabulary, when scores of all the objective candidates are calculated as described above, the processing amount of the score calculation does not pose a problem.

However, in recognition of intermediate vocabulary or large vocabulary, score calculation for all the words in an objective recognition dictionary, i.e., entire searching, causes an increase in arithmetic operation amount. As a result, a problem that a response time is delayed may be caused.

In order to solve this problem, the following method is used. That is, before score calculation for all the words is performed, preliminary selection using a simple evaluation scheme is performed, the number of words to be accurately subjected to score calculation is reduced on the basis of the result of the preliminary selection.

This method of reducing the number of objective words is disclosed in, e.g., Japanese Patent Publication No. 03-69120 [1991.10.30]. This application has the following object. That is, standards patterns are divided in the order of increasing effectiveness, and matching is performed by each determination criteria, so that the number of times of matching is decreased without decreasing a recognition rate. More specifically, of a large number of standard patterns classified into categories formed in a memory in advance, a predetermined number of standard patterns selected by a predetermined method at a high frequency are stored in primary and secondary determination areas. The primary determination area is designated to perform matching between an input voice pattern and the standard patterns, and the obtained result is stored. A predetermined number of upper categories are determined as recognition candidates on the basis of the determination result. The standard patterns of the recognition candidate categories of the secondary determination area, and matching between the input voice pattern and the recognition candidate categories is performed. The obtained result is stored. The primary and secondary matching results are integrated with each other, and a category having the shortest distance is determined as the recognition result of the input voice. With the above arrangement, the number of times of matching is reduced.

In general present voice recognition, even if accurate score calculation, e.g., matching or probability calculation, is performed, voice recognition is not easily performed. As in the former method, when preliminary selection is performed by simple evaluation, words which must be left are removed when the number of words is reduced, and a recognition rate may be decreased. In addition, even if a simple evaluation scheme is use, when the evaluation scheme is performed to all words, an arithmetic operation amount of the evaluation scheme is considerably large disadvantageously.

In contrast to this, in a general searching problem, the following method called binary tree searching is popularly used. That is, objective candidates are structured into a binary tree, searching is performed by following the binary tree. This binary tree searching method is disclosed in Japanese Unexamined Patent Publication No. 04-248722 [1992.9.4]. This application has the following object. That is, in data coding method using vector quantization, input data is coded at a high speed. More specifically, code vectors included in a code book are divided into categories of M types, the code vectors belonging to the categories of M types are classified into categories of M(2) types. Similarly, a code vector is divided to the Nth stage in the same manner as described above. The feature vectors of the categories are center-of-gravity vectors of the code vectors belonging to the categories. In the coding, searching is performed by calculating the distances of an input vector and feature vectors of the categories according to a tree structure, thereby obtaining an optimum code vector. With the above arrangement, the speed of the input data is increased.

The method of this application is a method of binary tree searching related to vector quantization, and it must be noted that this application is not related to voice recognition which is an object of the present invention.

However, in the method using such structuring, a searching range is limited on the basis of a predetermined search tree, i.e., local searching is performed. For this reason, how to structure and how to search by using this structure are important. It is required that an arithmetic operation amount is reduced without increasing distortion as much as possible in comparison with entire searching, i.e., without decreasing a recognition rate as much as possible.

For this mean, the binary tree searching easily poses a problem in which, although an arithmetic operation amount can be considerably reduced, distortion increases. In particular, in voice recognition, a recognition rate decreases to pose a serious problem.

In the voice recognition using the HMM, probability model are formed for recognition objective words in advance, a generation probability is calculated by a feature amount obtained by analyzing an unknown input voice signal. On the basis of the generation probability, scores are added to all the words. A word having the highest score is selected as a recognition result. In the voice recognition using the HMM, a beam searching method of reducing an arithmetic operation amount is used. In the beam searching method, branches are cut by using halfway results to reduce the arithmetic operation amount. However, in this method, since the number of words are reduced by the halfway results of the scores, words which must be left are removed. Therefore, distortion increases, and a recognition rate decreases.

In not only voice recognition but such a searching problem, the size of a memory capacity in which a search tree required for increasing a searching speed is occupied is an important problem.

SUMMARY OF THE INVENTION

The present invention has been made in consideration of the above circumstances, and has as its object to a voice recognizing method, an information forming method, a voice recognizing apparatus, and a recording medium which prevent a recognition rate from being decreased while reducing an arithmetic operation amount.

It is an object of the present invention to provide a voice recognizing method, an information forming method, a voice recognizing apparatus, and a recording medium in which the number of voice recognition objective words whose scores are calculated is limited to reduce an arithmetic operation amount and to increase the speed of voice recognition, an increase in required memory capacity is small, and an increase in distortion and a decrease in recognition rate are not caused by searching.

It is another object of the present invention to make it possible that a correlation value used for hierarchically structuring to limit the number of voice recognition objective words whose scores are calculated can be calculated without using voice data.

According to the present invention, in order to solve the above problems, there is provided a voice recognizing method in which a plurality of voice recognition objective words are given, and scores are added to the voice recognition objective words by using parameters which are calculated in advance for an unknown input voice signal, thereby extracting and recognizing a corresponding voice recognition objective word, characterized in that the voice recognition objective words are structured into a hierarchical structure by using correlation values between the voice recognition objective words, and score calculation is performed to the unknown input voice signal by using a dictionary of the voice recognition objective words structured in the hierarchical structure.

In this case, probability models for the plurality of voice recognition objective words are prepared, generation probabilities of the probability models are calculated with respect to the unknown input voice signal, a corresponding voice recognition objective word is extracted and recognized according to the generation probabilities, a state transition sequence is determined on the basis of state transition probabilities of probability models corresponding to the voice recognition objective words, a symbol sequence is determined on the basis of an output symbol probability corresponding to the state transition, a generation probability of the obtained symbol sequence is calculated for models corresponding to the voice recognition objective words is calculated, and the voice recognition objective words are preferably structured into a hierarchical structure by using correlation values between the voice recognition objective words based on the generation probability.

According to the present invention, there is provided an information forming method of forming information of pattern recognition objects used in a pattern recognizing method in which a plurality of pattern recognition objects are given, and scores are added to the pattern recognition objects by using parameters which are calculated in advance for an unknown input signal, thereby extracting and recognizing a corresponding pattern recognition objective word, characterized by comprising the step of grouping, on the basis of correlation values between the pattern recognition objects, the pattern recognition objects whose correlation values decrease, selecting pattern recognition objects serving as typical objects of groups, and performing grouping to form groups each having a relationship between a typical pattern recognition object and a set of pattern recognition objects belonging to the typical pattern recognition, the step of causing pattern recognition objects which are not selected as typical objects of the groups, with respect to a pattern recognition object having a small correlation value and serving as a typical object of any group, to belong to the group of the typical pattern recognition object, and the step of newly performing grouping and adding to a group to the typical pattern recognition objects obtained by performing the grouping and adding to the groups described above, wherein these steps are repeated a predetermined number of times to structure the words into a hierarchical structure.

In addition, information of pattern recognition objects such as voice recognition object words structured into the hierarchical structure can be recorded on a recording medium in advance.

The present invention can be applied, as the pattern recognition objects, not only the voice recognition objective words, but also pattern recognition objects in image information as in graphic recognition or character recognition.

In this manner, the voice recognition objective words (to be generally referred to as pattern recognition objects hereinafter) are structured into a hierarchical structure or a tree structure, which allows overlapping, in advance, and searching is performed according to this structure to limit the number of voice recognition objective words and to reduce an arithmetic operation amount. In addition, when correlation values between new words are defined, and a method of structuring the recognition words on the basis of the correlation values is performed, words whose scores are expected to be high are included in a searching range even if local searching is performed. Finally, distortion is rarely increased, and a decrease in recognition rate can be prevented.

When the correlation values between words are calculated on the basis of parameters of a probability model such as an HMM (Hidden Markov Model), a large amount of actual voice data corresponding to a recognition dictionary can be prevented from being used.

DETAILED DESCRIPTION OF THE PREFERRED EMBODIMENTS

Preferred embodiments of the present invention will be described below with reference to the accompanying drawings. Although the embodiments of the present invention exemplifies voice recognition, the present invention can be easily applied to recognition of various patterns such as a video, image, or a character.

A. First Embodiment

In the first embodiment of the present invention, voice recognition is briefly described first, and definition of a correlation value between voice recognition objective words (to be referred to as words hereinafter), a method of structuring a word using the correlation value, and a recognizing method using this structure will be described as a method for increasing the speed of the voice recognition. After a memory capacity and an arithmetic operation amount are simulated, the simulation result will be described, and then the efficiency of the simulation result will be described.

<Voice Recognition>

Figure 1:
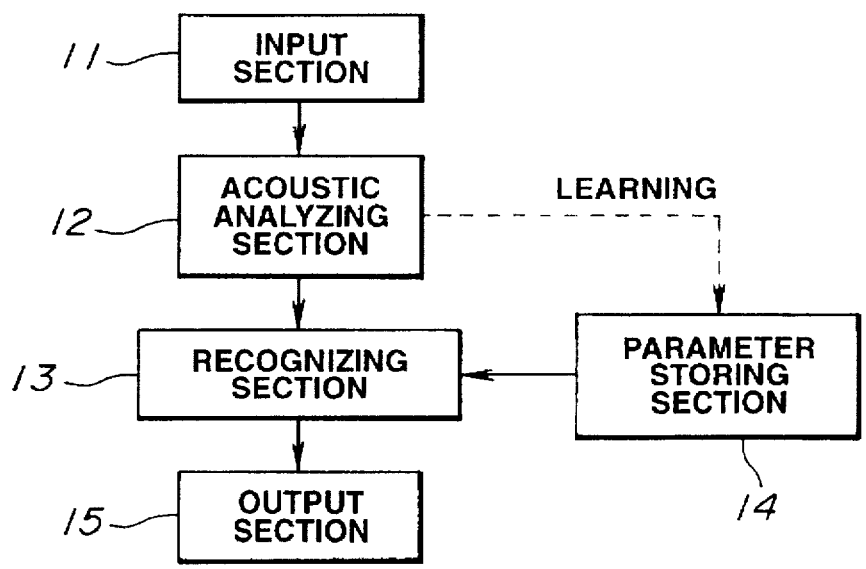
FIG. 1 is a block diagram schematically showing the arrangement of a general voice recognition system.

An apparatus used in voice recognition, as shown in FIG. 1, is generally constituted by an input section 11, an acoustic analyzing section 12, a recognizing section 13, a parameter storing section 14, and an output section 15 in many cases.

The input section 11 is constituted by a unit such as a microphone receiving a voice signal, an amplifier for amplifying the input signal, and an AD converter for converting the signal into a digital signal. After the input signal is sampled at 12 kHz, the sampled signal is transmitted to the acoustic analyzing section 12.

In the acoustic analyzing section 12, a feature amount required for recognition is extracted from the input voice signal. For example, the energy, zero cross number, pitch, and the like of a simple signal are extracted, or frequency analysis is performed by linear predictive coding (LPC), fast Fourier transform (FFT), band-pass filter (BPF), Wavlet transform, or the like. A feature amount is extracted as a vector time series having, as an element, energy whose band is divided. As an amount of change in feature amount, for example, differential data may be extracted as one of feature amounts simultaneously with the other feature amounts. The feature amounts obtained described above may be subjected to proper mapping such as Karhunen-Loeve (KL) transform or neutral network to further convert a feature amount having a high degree of separation. A feature amount vector may be compressed by vector quantization or the like to convert the feature amount vector into a quantized feature amount.

In this manner, in the acoustic analyzing section 12, the time series of feature amounts required for recognition is extracted from an input voice signal and transmitted to the recognizing section 13.

In the recognizing section 13, a recognizing process for unknown voice data is performed by using a parameter of the parameter storing section 14 which is formed on the basis of feature amounts obtained by acoustically analyzing voice data for learning in advance. In this case, recognition means that a word corresponding an input voice signal is selected from a given recognition dictionary. As this recognizing method, a method using DP matching, neural network, an HMM (Hidden Markov Model), or the like is mainly used.

The DP matching is the following scheme. That is, reference patterns called templates are obtained as parameters in advance on the basis of feature amounts obtained by analyzing voice signals, the parameters are compared with the feature amount of an unknown voice signal, and a parameter which is determined to be closest to the feature amount of the unknown voice signal is found. In order to absorb a variation in elocutionary speed, the following method is frequently used. That is, a time axis is expanded by a method called dynamic time warping such that distortion between the voice signal and the template is minimized.

The neural network is to perform recognition by a network model which imitates the structure of a human brain. In the neural network, the weight coefficient of a path is determined as a parameter in advance by a learning process, the distance between the parameter and each word in a dictionary is calculated on the basis of an output obtained by inputting the feature amount of an unknown voice signal to the network, thereby determining a recognition word.

The HMM is to perform recognition by a probability model. In the HMM, a transition probability and an output symbol probability are determined for a state transition model in advance on the basis of learning data, and a recognition word is to be determined on the basis of a probability of generating each model for the feature amount of an unknown voice signal. The HMM will be described later as the second embodiment of the present invention.

As described above, in a general recognizing process, a parameter, i.e., a template, determined on the basis of learning data, the weight coefficient of a network model, the statistic parameter of a probability model, and the like are calculated as a learning process, and the parameters are stored in the parameter storing section 14.

In a recognizing process, after an input unknown voice signal is acoustically analyzed, scores such as distances or generation probabilities according to the recognizing method are added to words in a given dictionary, and a word having a high score or a plurality of words having higher scores are selected as recognition results. The obtained recognition results are transmitted to the output section 15.

In the output section 15, the transmitted recognition results are displayed on a screen or output as sound. The output section 15 outputs commands for operating other units by using the recognition results.

<Inter-Word Correlation Value>

In the voice recognizing process described above, score calculation of the recognizing section 13 is performed between an input unknown voice signal and all the words in a given dictionary, i.e., the set of voice recognition objective words. In recognition of a small vocabulary, a processing amount rarely poses a problem. However, in recognition of an intermediate vocabulary or a large vocabulary, a processing amount poses a serious problem.

Therefore, an object of the present invention is as follows. That is, the recognition objective words are structured in a hierarchical structure or a tree structure which allows overlapping, the number of words whose scores are calculated can be reduced by using the structure. This is briefly shown in FIG. 2.

Figure 2:
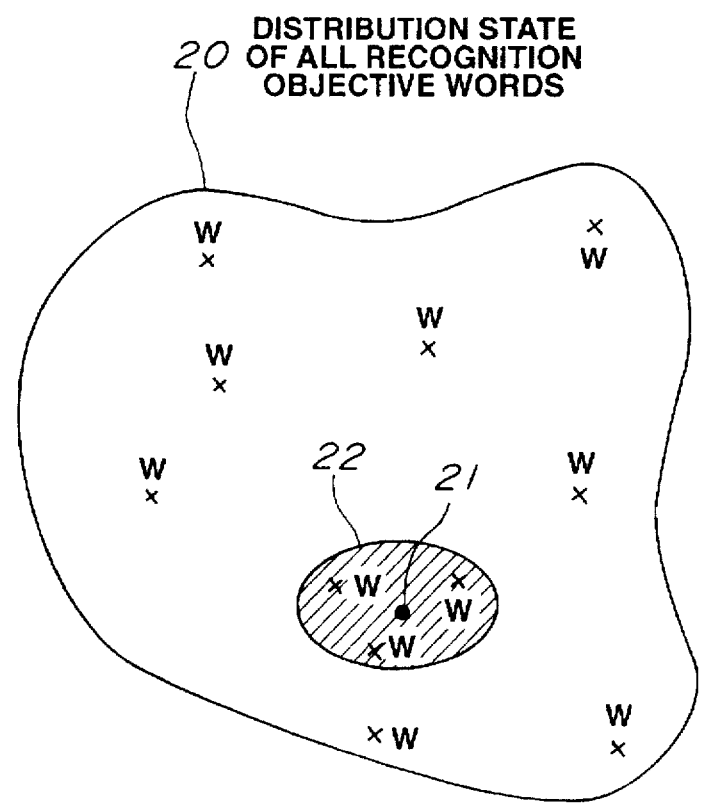
FIG. 2 is a view showing a word distribution for explaining the concept of recognition using structuring.

More specifically, referring to FIG. 2, in a distribution space 20 of all voice recognition objective words, when the distribution structure is obtained by using the relationships between words W, with respect to an input 21, a set 22 of words (i.e., words whose scores are competitive at an upper level) whose scores must be calculated and unnecessary words, i.e., words whose scores are not to be high, can be determined. The words whose scores need not be calculated are deleted, i.e., are out of words whose scores must be calculated, thereby reducing the processing amount or arithmetic operation amount of the recognizing unit.

In order to determine a word distribution structure suitable for such an object, a distance scale for knowing the relationship between words is required.

In general voice recognition, models corresponding words, i.e., templates, network models, and probability models, are formed, the parameters of these models are determined in a learning process, and score calculation using the models, i.e., distance calculation or probability calculation, is performed in a recognizing process. For this reason, the distance scale between an actual voice signal and the words may be defined by scores calculated on the basis of feature amounts obtained by acoustically analyzing the actual voice signal and the models corresponding to the words.

Scores used in voice recognition tend to largely vary depending on a speaker, an elocutionary speed, a change in environment, or the like. For example, when the scores of two voice signals generated in similar manners are calculated by the same model, the scores are often different from each other. When the scores of two voice signals generated in similar manners are calculated by different models, the following phenomenon is frequently observed. That is, one voice signal has a high score with respect to one model, and the other voice signal has a high score with respect to the other model (the order is reversed).

In order to absorb this variation, it is considered that a correlation value between words is defined by expected values of scores used in each recognizing method.

Recognition objective words are represented by $W_i$ ($1 < i < N$), and a set of actual voice signals corresponding to the respective words $W_i$ are represented by $X_i = \{X_i^1, X_i^2, X_i^3, \ldots \}$. In this case, N represents the number of recognition objective words, i.e., the number of words included in a dictionary.

A score calculated between feature amounts obtained by acoustically analyzing a certain voice signal $X_j^k$ and a model corresponding to a word $W_i$ whose parameter is determined by learning, e.g., the distance between the voice signal and a template in DP matching or a generation probability in an HMM, is described as $S(X_j^k, W_i)$.

It is assumed that the score is normalized as in numeral expression (1)

$$S(X_j^k, W_i) \equiv \frac{S_{org}(X_j^k, W_i)}{\sum_{i=1}^{N} S_{org}(X_j^k, W_i)} \quad (1)$$

In expression (1), $S_{org}(X_j^k, W_i)$ is a score before normalization, $S(X_j^k, W_i)$ is a normalized score.

When a certain voice signal $X_1^1$ is used, a score $S(X_1^1, W_i)$ can be calculated for each word. Similarly, a score $S(X_1^2, W_i)$ is calculated by using a voice signal $X_1^2$. Subsequently, scores can be calculated by using a set of voice signals $X_1 = \{X_1^1, X_1^2, X_1^3, \ldots \}$ corresponding to $W_1$. Therefore, when it is assumed that the expected values, e.g., average values, of the scores calculated for words with respect to the set $X_1$ of the voice signal are expressed as $Se(X_1, W_i)$, the average values can be calculated by expression (2):

$$S_e(X_1, W_i) \equiv \frac{1}{K} \sum_{k=1}^{K} S(X_1^k, W_i) \, (i = 1, 2, \ldots, N) \quad (2)$$

In this case, K is the number of data of the voice signal corresponding to $W_1$, and it is assumed that the number is sufficiently large.

Similarly, between a set of voice signals $X_j = \{X_j^1, X_j^2, X_j^3, \ldots \}$ corresponding to words Wj and words, the expected values of scores can be calculated by expression (3):

$$S_e(X_j, W_i) \equiv \frac{1}{K} \sum_{k=1}^{K} S(X_j^k, W_i) \, (i = 1, 2, \ldots, N) \quad (3)$$

If a voice recognizing scheme whose recognizing performance is guaranteed to some extent is used, it is expected that, with respect to the set $X_1$ of voice signals corresponding to the words $W_1$, $Se(X_1, W_1)$ is highest in the expected values of scores calculated by expression (3). Similarly, it is expected that, with respect to a set $X_j$ of voice signals corresponding to the words $W_j$, $Se(X_j, W_j)$ is highest in the expected values of scores calculated by expression (3). It is expected that the words $W_i$ having expected values $Se(X_j, W_i)$ of scores which are high with respect to $X_j$ has a score $S(X_j^k, W_i)$ which is high with respect to an unknown voice signal $X_j^k$. In contrast to this, it is expected that the words $W_i$ having expected values $Se(X_j, W_i)$ of scores which are low with respect to $X_j$ has a score $S(X_j^k, W_i)$ which is low with respect to the unknown voice signal $X_j^k$.

The expected values $Se(X_j, W_i)$ of the scores calculated by expression (3) are recognized as distance scales $D(W_j, W_i)$ of the words $W_i$ with respect to the words $W_j$.

$$D(W_j, W_i) \equiv S_e(X_j, W_i) = \frac{1}{K} \sum_{K=1}^{K} S(X_j^k, W_i) \, (i = 1, 2, \ldots, N) \quad (4)$$

When the distances between words and templates are used as the scores $S(X_j^k, W_i)$ are used, a small distance scale $D(W_j, W_i)$ expressed by expression (4) means that the word $W_j$ is close to the word $W_i$. When a generation probability in an HMM or the like is used, a large distance scale $D(W_j, W_i)$ means that the word $W_i$ is close to the word $W_j$.

At this time, on the basis of the distance scale $D(W_j, W_i)$, the words $W_i$ (i=1, 2, ..., N) can be sequentially arranged from a word which is close to the word $W_1$. Similarly, the words $W_i$ (i=1, 2, ..., N) can be sequentially arranged from a word which is close to the word $W_2, W_3, ..., W_N$.

The places of the words $W_i$, i.e., the places of the words $W_i$ arranged from a word close to the words $W_j$, are defined as a correlation value $R(W_j, W_i)$ of the words $W_i$ to the words $W_j$. For example, a word $W_i$ which is closest to the words $W_j$ is defined as 1, a word $W_i$ which is secondly close to the words $W_j$ is defined as 2. Similarly, a word $W_i$ which is farthest from the words $W_j$ is defined as N.

When there are words having distance scales $D(W_j, W_i)$ expressed by expression (4) which are equal to each other and having the same place, these words are not forcibly ordered, and equal correlation values are set for the words. For example, when there are two words having the third place, 3 is set for these words.

The correlation values $R(W_j, W_i)$ defined as described above are set to be integer values falling within the range of 1 to N, and are in inverse proportion to correlation. More specifically, high correlation or a small correlation value $R(W_j, W_i)$ means that the scores $S(X_j^k, W_i)$ calculated by the models of the words $W_i$ are expected to be high with respect to the unknown voice signal $X_j^k$ corresponding to the word $W_j$. Low correlation or a large correlation value $R(W_j, W_i)$ means that the scores $S(X_j^k, W_i)$ calculated by the models of the words $W_i$ with respect to the unknown voice signal $X_j^k$ corresponding to the word $W_j$ is expected to be low. In this case, as is apparent from the definition of the correlation values correlation values $R(W_j, W_i)$ and $R(W_i, W_j)$, it must be noted that these correlation values are not necessarily equal to each other.

A method of structuring target voice recognition objective words on the basis of the correlation values described above will be described below.

<Structuring of Recognition Objective Word>

Before a method of structuring voice recognition objective words is described, how to structure the voice recognition objective words is briefly described.

Basically, the voice recognition objective words are separated into typical words and words belonging to the typical words. When recognition is to be actually performed, with respect to an input voice signal, a recognizing process is performed in the typical words first. This process means that a position at which the voice signal is input is examined in a distribution space 20 of all the recognition objective words in FIG. 2. Words to be further subjected to a recognizing process are limited according to the result of the recognizing process. Finally, only a recognizing process to typical words and some words, i.e., only local searching, is performed to obtain a recognition result.

Figure 3:
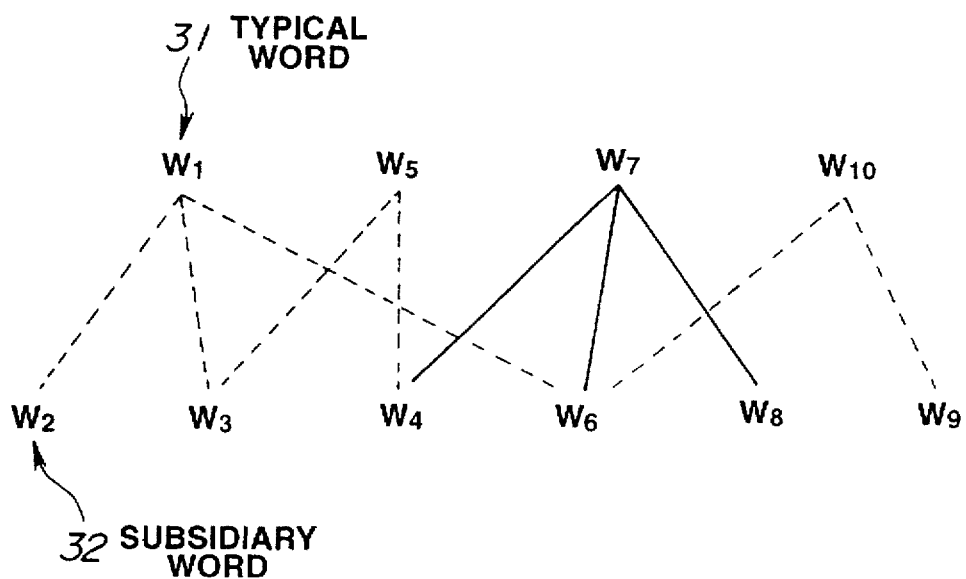
FIG. 3 is a view showing the relationship between a typical word and words belonging to the typical word.

For example, when the relationship shown in FIG. 3, i.e., subordination between four words $W_1, W_5, W_7$, and $W_{10}$ and six words $W_2, W_3, W_4, W_6, W_8$, and $W_9$ serving as words 32, is obtained, a recognizing process is performed in only the typical words. By using the recognition result, on the basis of a certain determination criteria, words to be subjected to a recognizing process are selected. For example, when words belonging to the typical word $W_7$ are selected, four words $W_1, W_5, W_7$, and $W_{10}$ serving as typical words 31 and the words $W_4, W_6$, and $W_8$ belonging to the word $W_7$ are subjected to the recognizing process. As a result, a word having the highest score is selected from these words.

Therefore, a correct solution can be obtained in the entire searching. More specifically, if a word corresponding to an input voice signal has the highest score, a correct solution can be necessarily obtained with respect to an input voice signal corresponding to a typical word.

In contrast to this, with respect to an input voice signal corresponding to a word other than typical words, when a recognizing process is performed in only the typical words, a correct solution must not be obtained as a matter of course. However, when scores are added to the typical words, typical words having high scores, i.e., typical words having high correlation, can be extracted.

It is assumed that words having high correlation, i.e., small correlation values, for the word serving as a correct solution are included in the typical words, and that the word serving as the correct solution is included in the words belonging to the typical words. In this case, words having high scores are selected from the typical words, words belonging to the selected words are extracted, and the extracted words are further subjected to a recognition process. As a result, it is expected that the correct solution can be obtained.

On the basis of the above consideration, a method of structuring recognition objective words will be described below with reference to FIG. 4.

Procedure 1. Grouping (step S41)

When both the words $W_i$ and $W_j$ have the small correlation values $R(W_j, W_i)$ and $R(W_i, W_j)$ (high correlation), it is expected that the scores $S(X, W_i)$ and $S(X, W_j)$ increase for input voice signals X corresponding to the respective words. For this reason, the two words are grouped. In this case, one of the words is defined as a typical word, and the other is defined as a word belonging to this typical word. Words which are not grouped are defined as typical words to be used as single groups, respectively.

Procedure 2. Adding to Group (step S42)

Words $W_j$ which belong to any groups and are not defined as typical words are caused to belong to the groups of the words $W_i$ selected as typical words in the words $W_i$ having small correlation values $R(W_j, W_i)$. This process is a process which is performed to increase the number of groups, to which the words $W_i$ selected as typical words belong and which have the typical words $W_i$ having high correlation for the words $W_j$, as large as possible.

Procedure 3. Forming Hierarchy

Grouping is performed such that the above grouping and adding to a group are performed as a single step, similarly, the typical words of the groups are newly grouped, and the typical words are grouped. The above operation is repeated to form a search tree having a hierarchical structure. More specifically, when the grouping and adding to the groups are performed, words which are correlated to each other are grouped at a certain hierarchy, and one typical word for each group is selected. The typical words serve as constituent elements of the hierarchy.

Figure 4:
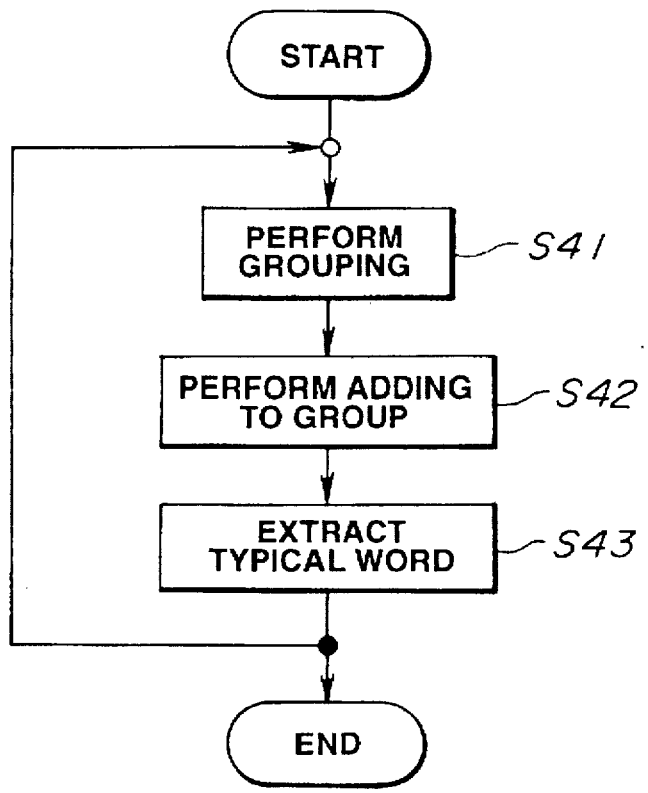
FIG. 4 is a flow chart for explaining a method of structuring recognition objective words in a hierarchical structure.

In the flow chart in FIG. 4, the grouping is performed in step S41, the adding to the groups is performed in step S42, and the typical words are selected in step S43. The selected typical words are subjected to the grouping in step S1 and the adding to the groups in step S2. The operation is repeated to hierarchically structure the words.

Figure 5:
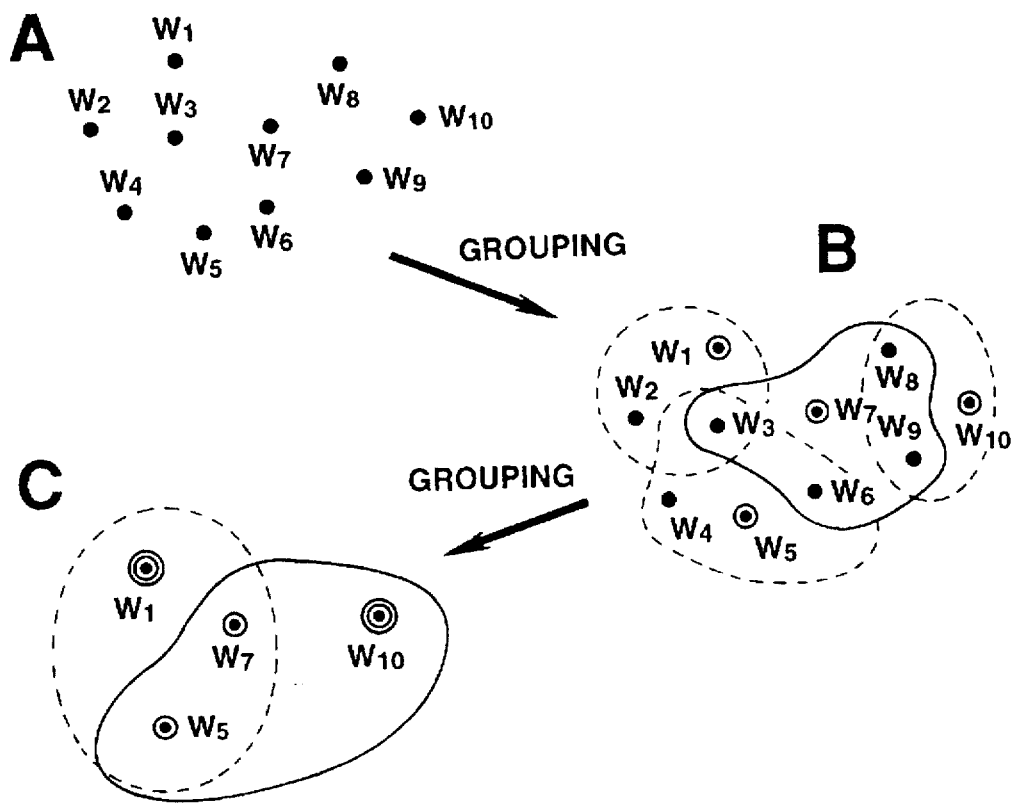
FIG. 5 is a view for explaining the concept of a process of structuring words into a hierarchical structure.

FIG. 5 shows an example of such grouping.

Voice recognition objective words $W_i$ (i=1, 2, ..., 10) given as indicated by A in FIG. 5 is subjected to grouping in steps S41 and S42 as indicated by B in FIG. 5, and typical words $W_1, W_5, W_7$, and $W_{10}$ are selected in step S43. Similarly, the typical words are subjected to the processes in steps S41 and S42 and subjected to the grouping indicated by C in FIG. 5, and the typical words $W_1$ and $W_{10}$ are selected in step S43. Finally, a search tree is obtained.

An example of the structuring will be described below.
<Grouping>

Procedure 1. A group $G_i$ corresponding to each word $W_i$ is formed, the number of elements of the group is represented by $n(G_i)$.

An initial state is defined by:

$$Gi=\{Wi\}, n(Gi)=1 \qquad (5)$$

and the typical word of each group $G_i$ is represented by $W_i$.

Procedure 2. A correlation value $R(W_j,W_i)$ (i=1, 2, ..., N) is calculated for each word $W_j$.

Procedure 3. i=1

Procedure 4. j=i+1

Procedure 5. When $R(W_j,W_i) \leq r$ and $R(W_i,W_j) \leq r$, the following processes are performed to this (i,j), otherwise, go to the next procedure 6.

(1) When $n(G_i) \geq 1$ and $n(G_j) \leq 1$, the following procedure (I) is executed.

(2) When $n(G_i) \leq 1$ and $n(G_j) \geq 1$, the following procedure (II) is executed.

(3) When $n(G_i) > 1$ and $n(G_j) < 1$, if elements other than $W_i$ included in the group $G_j$ are the same as elements other than $W_j$ included in the group $G_j$, the following procedure (I) (or procedure (II)) is executed.

Procedure (I): There is nothing to do when the word $W_j$ belongs to the group $G_i$ in advance. When the word $W_j$ belongs to the group $G_j$, the word $W_j$ is added to the group $G_i$, $n(G_i)$ is incremented by 1, and $n(G_j)=0$ is set.

Procedure (II): There is nothing to do when the word $W_i$ belongs to the group $G_j$ in advance. When the word $W_i$ belongs to the group $G_j$, the word $W_i$ is added to the group $G_j$, $n(G_j)$ is incremented by 1, and $n(G_i)=0$ is set.

Procedure 6. j is incremented by 1. When $j \leq N$, return to the procedure 5.; when j>N, go to the next procedure 7.

Procedure 7. i is incremented by 1. When $i \leq N-1$, return to the procedure 4.; when i>N-1, the operation is ended.

Figure 7:
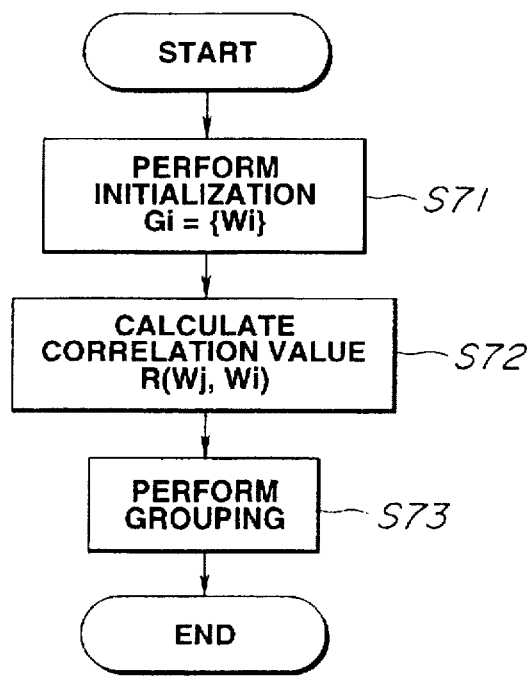
FIG. 7 is a flow chart for explaining a basic method related to grouping.

The method of grouping will be briefly described below with reference to a flow chart in FIG. 7.

Groups are initialized in step S71, correlation values are calculated in step S72, and processes corresponding to the procedures 3. to procedures 7., i.e., grouping for different words $W_i$ and $W_j$ on the basis of the correlation values, are preformed. As determination criteria, the following conditions in the process of the procedure 5. are used:

$$R(W_j,W_i) \leq r \text{ and } R(W_i,W_j) \leq r \qquad (6)$$

In this case, as r, an integer (e.g., about 2 to 10) larger than 1 and smaller (sufficiently) than a recognition objective word number N. More specifically, the words $W_i$ and $W_j$ whose correlation values $R(W_j,W_i)$ and $R(W_i,W_j)$ decrease are grouped.

When such words $W_i$ and $W_j$ are found, basically, as in (1) and (2) shown in the procedure 5., a word which is not a typical word is caused to belong to the group of the typical word. More specifically, the process (I) or the process (II) is performed. For example, when $G_1=\{W_1, W_2\}$ and $G_3=\{W_3\}$, the above expression (6) is established between $W_1$ and $W_3$. In this case, $G_1=\{W_1, W_2, W_3\}$ is preferably set, $G_3$ is preferably set to be an empty set.

When both the groups have elements which belong to words other than the typical word, i.e., in (3) in the procedure 5., and only when the elements other than the typical word are equal to each other, the process (I) (or process (II)) is executed. For example, when $G_5=\{W_1, W_5\}$ and $G_7=\{W_2, W_7\}$, even if expression (6) is established with respect to $W_5$ and $W_7$, grouping is not performed. However, when $G_5=\{W_1, W_2, W_5\}$ and $G_7=\{W_1, W_2, W_7\}$, and expression (6) is established with respect to $W_5$ and $W_7$, $G_5$ is changed into $G_5=\{W_1, W_2, W_5, W_7\}$, and $G_7$ is set to be an empty set. In contrast to this, $G_5$ may be set to be an empty set, and $G_7$ may be changed into $G_7=\{W_1, W_2, W_5, W_7\}$.

When $n(G_i)=1$ and $n(G_j)=1$ are established, and expression (6) is established with respect to $W_i$ and $W_j$, either of the procedures (I) or the procedure (II) may be executed.

As r in expression (6) of the determination condition decreases, a condition for grouping becomes severe. For this mean, r=2 is set, the processes of the procedures 1. to the procedure 7. are performed, and r=3 is set, and the processes of the procedure 3. to the procedure 7 are performed. Similarly, while r is increased one by one, until $r \leq r_a$ is satisfied, the processes of the procedure 3. to the procedure 7. are repeated. In this manner, words which are correlated with each other sequentially grouped such that words which are mostly correlated with each other are grouped first, words which are secondly correlated with each other are grouped, and words which are thirdly correlated with each other are grouped. With respect to words which are selected as typical words, effective structuring can be performed because words which are strongly correlated to the above words serve as typical words on the initial stage. In this case, as ra, an integer (e.g., about 3 to 10) which is larger than 2 and sufficiently smaller than the recognition objective word number N is set.

Figure 8:
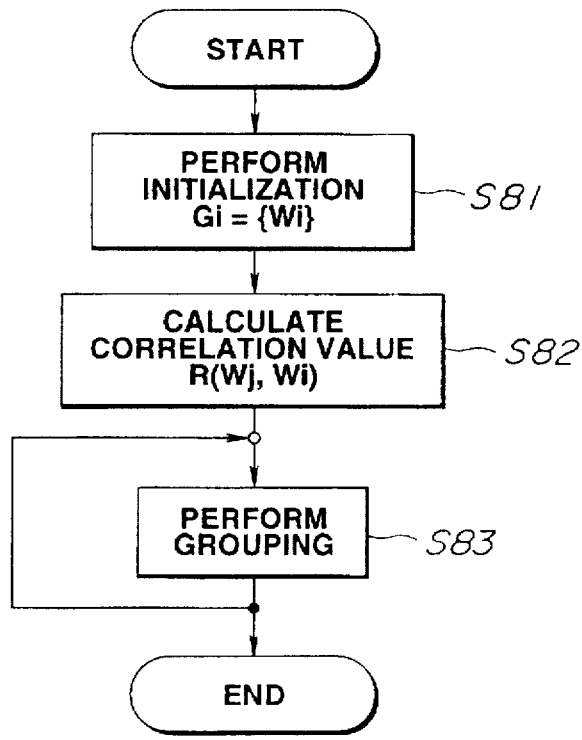
FIG. 8 is a flow chart for explaining a method obtained by improving the grouping method in FIG. 7.

The above operation is shown in FIG. 8. Steps S81, S82, and S83 in FIG. 8 correspond to steps S71, S72, and S73, respectively. However, in step S83 corresponding to the processes of the procedure 3. to the procedure 7., until $r \leq r_a$ is satisfied while r is increased one by one, these processes are repeated.

In addition, in place of expression (6) of the determination condition, $r_j$ is set for $W_j$ as in expression (7):

$$R(W_j,W_i) \leq rj \text{ and } R(W_i,W_j) \leq ri \qquad (7)$$

For example, $r_j$ may be changed depending on $n(G_j)$ as in expression (8):

$$rj=n(Gj)+r-1 \ (j=1,2, \ldots, N) \qquad (8)$$

In this case, r=2, i.e., $r_j=2$, is set first, and the processes of the procedure 1. to the procedure 7. are performed. According to the number of elements of each obtained group, r=3 is set, and $r_j$ is reset by expression (8), and the processes of the procedure 3. to the procedure 7. Similarly, r is incremented one by one, and the processes of the procedure 3. to the procedure 7. are repeated until $r \leq r_a$ is satisfied while $r_j$ is reset by expression (8) according to the number of elements of each group. In this manner, a state wherein the words $W_i$ and $W_j$ which are originally, strongly correlated with each other are not grouped can be moderated. In particular, the following state can be moderated. That is, the correlation values $R(W_j,W_i)$ is slightly increased because there are a large number of words $W_k$ correlated to the words $W_j$, and the words $W_i$ and $W_j$ are not grouped.

For example, even if $R(W_5,W_1)=2$ is satisfied with respect to $W_5$, $R(W_1,W_3)=2$, $R(W_1,W_8)=3$, and $R(W_1,W_5)=4$ are satisfied with respect to $W_1$. In this case, if the determination of expression (6) is not performed while $r \geq 4$, the words $W_1$ and $W_5$ are not grouped. However, if, after grouping is performed such that $G_1=\{W_1, W_3, W_8\}$ is satisfied, the determination of expression (7) is performed while r=2, the words $W_1$ and $W_5$ are grouped. This is because $r_1=5$ and $r_5=3$ are satisfied by expression (8).

Therefore, structuring can be more efficiently performed. In this case, as in the above case, an integer (e.g., about 3 to 10) which is larger than 2 and sufficiently smaller than the recognition objective word number N is set as $r_a$.

<Adding to Group>

Procedure 1. j=1

Procedure 2. When the words $W_j$ are not typical words, i.e., when $n(G_j)=0$ is satisfied, the following processes are performed; otherwise, go to the next procedure 3.

(a) i=1

(b) When the words $W_i$ are typical words, i.g., when $n(G_i)>0$ is satisfied, the following processes are performed; otherwise, go to (c).

When $R(W_j, W_i) \leq r_b$ is satisfied, the following process (III) is executed.

(c) i is incremented by 1. When $i \leq N$ is satisfied, return to (b); when i>N, go to the next procedure 3.

The process (III) is the following process.

Process (III): There is nothing to do when the words $W_j$ belong to the group $G_i$ in advance. When the words $W_j$ do not belong to the group $G_i$, the words $W_j$ are added to the group $G_i$, and $n(G_i)$ is incremented by 1.

Procedure 3. j is incremented by 1. When $j \leq N$, return to the procedure 2.; when j>N, the operation is ended.

The adding to the group will be additionally described below. Words are separated into typical words and word belonging thereto by the above grouping. In the recognizing process, only the typical words are subjected to a recognizing process. On the basis of the result of the recognition process, words which must be subjected to the recognizing process are selected.

More specifically, with respect to the words which are selected as typical words, the following is important. That is, words which are strongly correlated with each other are included in the typical words as possible, and belong to the groups of the typical words.

Therefore, the processes of the procedure 1., the procedure 2., and the procedure 3. are performed, and attention is given to the words $W_j$ which are not selected as typical words. Words which are strongly correlated to each other in the words $W_i$ selected as typical words, i.e., the words $W_i$ which satisfy expression (9):

$$R(W_j, W_i) \leq rb \qquad (9)$$

are found. When the words $W_j$ have not belonged to the corresponding groups $G_i$, the words $W_j$ are added as elements of the groups.

Note that an integer (e.g., about 3 to 20) which is larger than 2 and smaller than the recognition objective word number N is set as $r_b$ in expression (9). In order to prevent degradation of recognition performance, r in expression (6) and $r_i$ and $r_j$ in expression (7) in the grouping must not be set to be excessively large values, i.e., a severe determination condition is preferably set. In contrast to this, $r_b$ in expression (9) is preferably set to be a value which is large as much as possible.

This is because words which are selected as typical words may be included in words to be subjected to a recognizing process (score calculation) in the recognizing process. For this mean, in grouping, words which are not strongly correlated to each other are not desirably grouped, i.e., the process in which one of the words is set to be a typical word and the other word is set to be a word belonging to the typical word is not desirably performed. Therefore, r in expression (6) and $r_i$ and $r_j$ in expression (7) must not be set to be excessively large values.

In contrast to this, after grouping is temporarily performed, when the words which are selected as typical words belong to groups whose number is large as much as possible, a probability that the words are included in the words to be subjected to the recognizing process (score calculation) in the recognizing process increases. For this mean, rb in expression (9) is preferably set to be large as much as possible. In particular, when the words are included in the groups using, as typical words, words which are strongly correlated to the above words, a better effect can be expected.

When $r_b$ in expression (9) is increased, a search range in the recognizing process is expanded, i.e., the number of words whose scores are calculated is increased. For this reason, as an original object, in order to decrease the processing amount (arithmetic operation amount) of the recognizing process an original object, $r_b$ must not be excessively large. Therefore, $r_b$ is preferably se to be slightly larger than r in expression (6) or $r_i$ or $r_j$ in expression (7).

<Forming Hierarchy>

Procedure 1. With respect to all the recognition objective words $\{W_i: i=1, 2, \ldots, N\}$, $W_i$ is represented by $W_i^0$ or the like. It is assumed that $N^0=N$ is satisfied.

Procedure 2. m=1

Procedure 3. Grouping having, one step, the process of grouping and the process of adding to groups is performed to words $\{W_i^{m-1}: i=1, 2, \ldots, N^{m-1}\}$. It is assumed that the obtained typical words are represented by $\{W_i^{m-1}: i=1, 2, \ldots, N^{m-1}\}$. Note that $N^m$ is the number of typical words.

Procedure 4. m is incremented by 1, when $m \leq M$ is satisfied, returns to the procedure 3; when m>M is satisfied, the operation is ended.

The forming hierarchy will be briefly described below with reference to FIG. 4.

The process of the procedure 3. when m=1 means that the grouping in step S41 and adding to the groups in step S42 are performed. When the grouping in step S41 performed first is performed, words which are strongly correlated to each other are grouped, and subordination between these words is determined.

Next, m=2 is set, and typical words obtained when m=1 are grouped. However, in the first grouping, the words which are strongly correlated to each other are grouped, and subordination between the words is determined.

Figure 6:
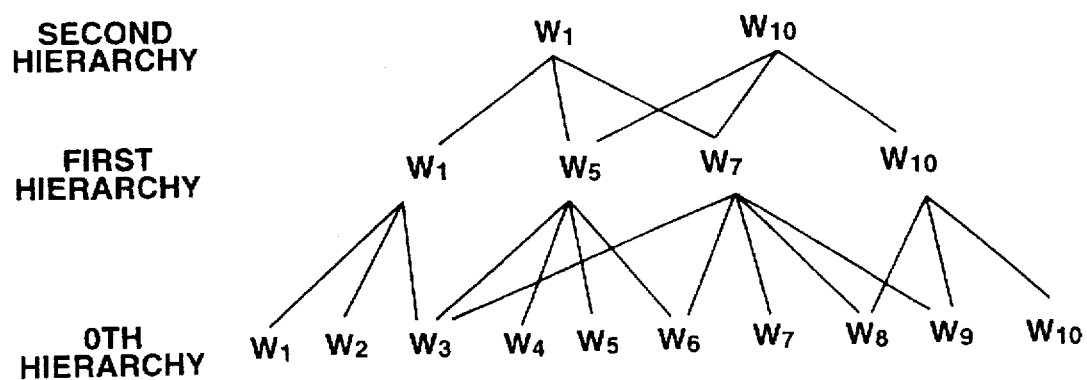
FIG. 6 is a view showing a hierarchical structure and search tree which are obtained by structuring of the present invention.

Subsequently, similarly, until m>M is satisfied, grouping is performed in the same manner as described above. A search tree having a hierarchical structure shown in FIG. 6 can be obtained. In consideration of the forming process, it is expected that words in a certain hierarchy are connected to each other through paths because words which are strongly correlated to each other are present on the upper hierarchy as typical words. More specifically, it is expected that, for words in the lowest hierarchy (i.e., set of all recognition objective words), paths to the words which are strongly correlated to each other are connected to an upper hierarchy.

Figure 9:
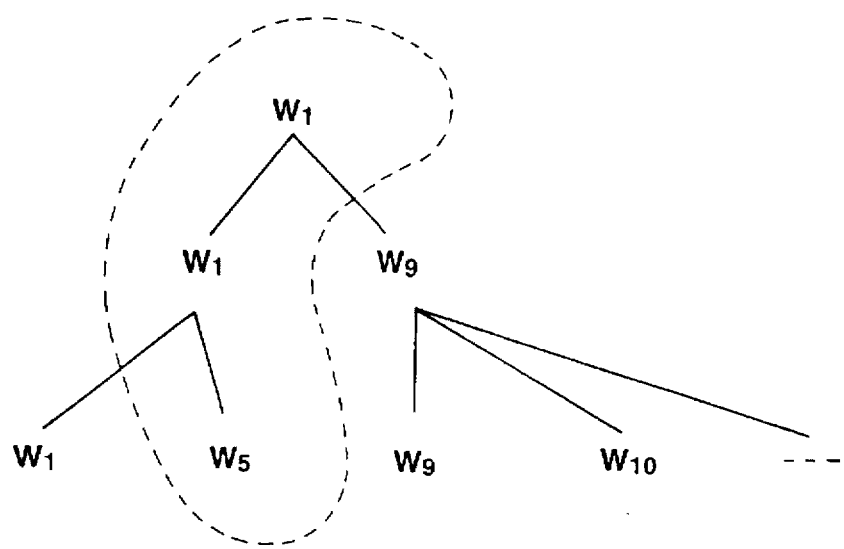
FIG. 9 is a view showing the relationship between words which are strongly correlated to each other.

For example, as shown in FIG. 9, the relationship such as expression (6) or expression (7) is established between the words $W_1$ and $W_5$, and it is assumed that $W_1$ becomes a typical word, and $W_5$ becomes a word belonging to the typical word. In addition, after both the words $W_1$ and $W_9$ are selected as typical words, grouping is performed again. As a result, the relationship such as expression (6) or expression (7) is established between the words $W_1$ and $W_9$.

and it is assumed that $W_9$ becomes a typical word, and $W_1$ becomes a word belonging to the typical word. In this case, it can be expected that the words $W_5$ and $W_9$ are strongly correlated to each other.

However, the strength of correlation between words on the lowest hierarchy and words obtained by following the paths to upper hierarchies is expected to be lowered toward an upper hierarchy. Therefore, if words to be subjected to a recognizing process are limited on the basis of the obtained search tree, words are limited from words in an excessive upper hierarchy to the lowest words. It is undesirably expected that the limiting increases distortion, i.e., degrades a recognition ratio. For this mean, the highest hierarchy M of the search tree obtained by the forming hierarchy is preferably prevented from being excessively high.

Note that it is assumed that $W_i^m$ is called a word of the mth hierarchy. For example, a set of recognition objective words is words in the 0th hierarchy, and it is assumed that a set of typical words selected from the words in the 0th hierarchy is called words in the first hierarchy.

<Recognizing Method>

A recognizing method using the search tree obtained by hierarchically structuring the recognition objective words as described above will be described below.

Figure 10:
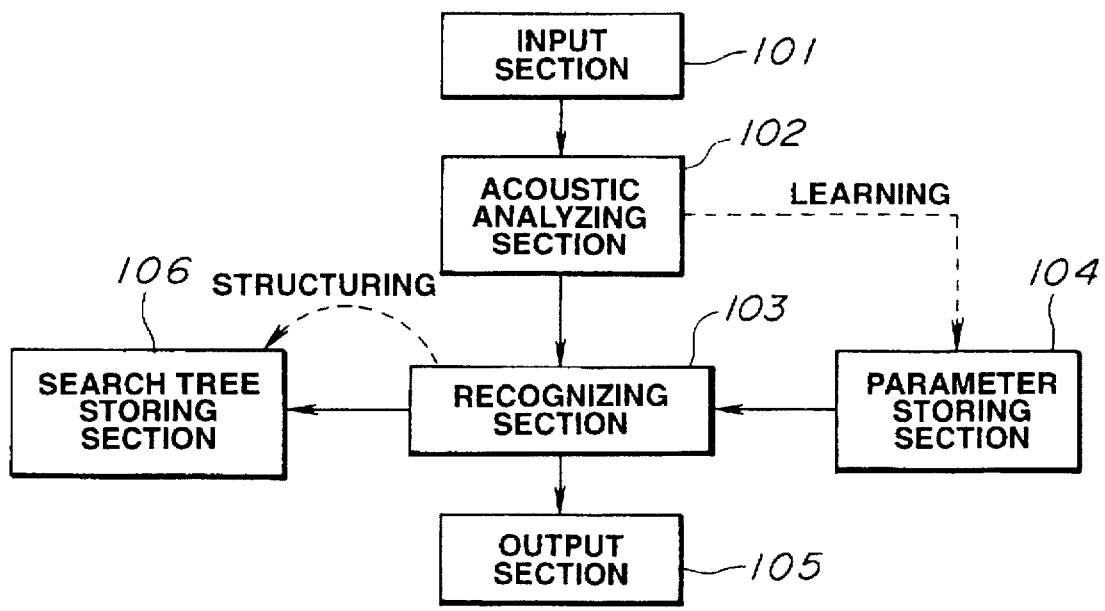
FIG. 10 is a block diagram showing an arrangement of a voice recognition system to which an embodiment of the present invention is applied.

In this voice recognition, in place of the arrangement shown in FIG. 1, an arrangement shown in FIG. 10 is used.

In this case, the operations of an input section 101, an acoustic analyzing section 102, a parameter storing section 104, and an output section 105 are the same as those of the sections 11, 12, 13, 14, and 15 shown in FIG. 1.

More specifically, an input signal input to the input section 101 is analyzed by the acoustic analyzing section 102, and an obtained feature amount is transmitted to a recognizing section 103.

In the learning process, a parameter used in the recognizing process is determined on the basis of voice data for learning, and the parameter is stored in the parameter storing section 104. The recognition objective words described above are newly structured by using actual voice data. An obtained search tree is stored in a search tree storing section 106. More specifically, score calculation in the recognizing section 103 is performed to actual voice data corresponding to each recognition objective word, and a search tree is formed on the basis of the structuring method and stored in the search tree storing section 106.

In the recognizing process, an unknown voice signal input from the input section 101 is acoustically analyzed in the acoustic analyzing section 102, and an obtained feature amount is transmitted to the recognizing section 103. The following recognizing process is performed.

Procedure 1. Score calculation is performed to words in the Mth hierarchy, p upper words having higher scores are selected.

Procedure 2. m=M

Procedure 3. On the basis of the search tree in the search tree storing section 106, from the p upper words having higher scores and selected on the mth hierarchy, words on the (m−1)th hierarchy to which the p words belongs are extracted. Score calculation is performed to these words again, and p upper words having higher scores are selected.

Procedure 4. m is decremented by 1. When m>0, return to 3. When m=0, go to the procedure 5.

Procedure 5. Words having higher scores or a plurality of upper words are selected from the words extracted on the 0th hierarchy.

The words having higher scores and selected in the procedure 5, or a plurality of upper words are transmitted to the output section 105.

In the output section 105, the transmitted recognition results are displayed on a screen or output as sound. The 105 outputs commands for operating other units by using the recognition results.

The process of the procedure 1. is called initial searching, and the processes of the procedure 2 to the procedure 4. are called structure searching.

Figure 11:
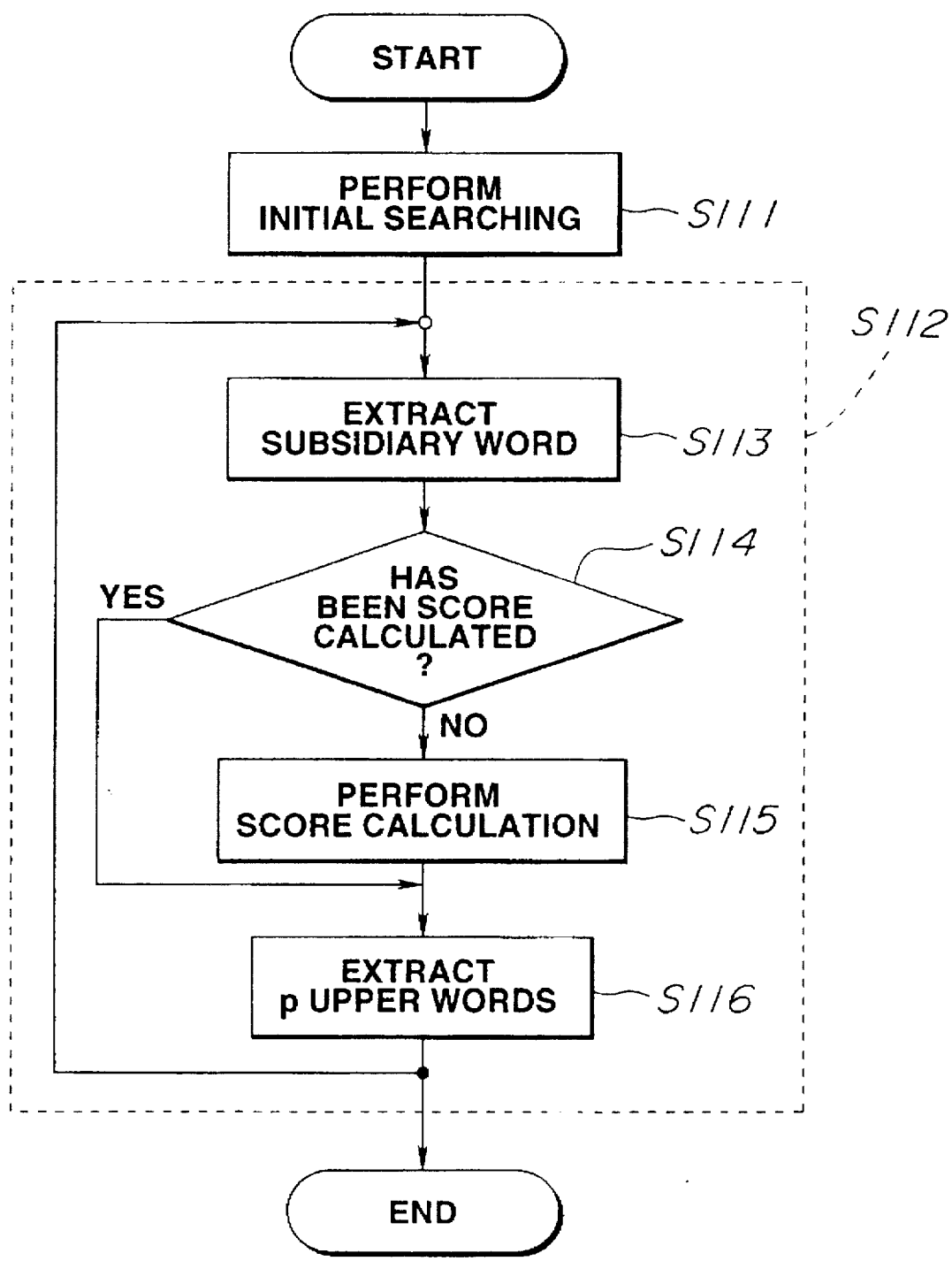
FIG. 11 is a flow chart for explaining a recognizing method using a search tree which is obtained by hierarchical structuring in the embodiment of the present invention.

FIG. 11 is a flow chart for explaining the outline of the above recognizing process.

In the first step S111 in FIG. 11, searching for the Mth hierarchy is performed as initial searching. Thereafter, structural searching from searching for the (M−1)th hierarchy to searching for the 0th hierarchy is performed. In step S113, words on the mth hierarchy are extracted. It is checked in step S114 whether score calculation has been performed to the extracted words. If NO in step S114, the flow is shifted to step S115 to perform score calculation, and the flow is shifted to step S116. If YES in step S114, the flow is directly shifted to step S116. In step S116, p upper words having calculated higher scores are selected.

The initial searching means score calculation which is performed to the typical words of the uppermost hierarchy first in the recognizing process, and the structural searching means a process of performing score calculation to words belonging to the p typical words selected in searching for a hierarchy which is higher then the above hierarchy by one on the basis of the search tree. In the above structural searching, words whose scores are calculated as typical words, or words which are repetitively included in two or more extracted groups are used. For this reason, the scores of the words whose scores have been calculated are temporarily are stored, the scores of these words are prevented from being repetitively calculated.

<Estimation of Memory Capacity>

In the recognizing process using the search tree described above, a memory capacity required for the search tree is estimated. A total word number is represented by N. It is assumed that words on a certain hierarchy are degenerated into groups whose number is ½ the word number, and that the average number of elements of each group is 10, the number of words on a hierarchy m is given by:

$$(\frac{1}{2})^m N \qquad (10)$$

An average number (10) of paths of the search tree must be stored as subordination from given words to words on a hierarchy lower than the hierarchy of the given words. With respect to all the words on the first hierarchy to the Mth hierarchy, paths whose number is given by the following expression:

$$\sum_{m=1}^{M} \left(\frac{1}{2}\right)^m N \times 10 \qquad (11)$$

must be stored. In this case, the Mth hierarchy is the uppermost hierarchy of the search tree. Therefore, even if M is set to be sufficiently high, as a memory capacity, only path information represented by the following expression: may be stored.

$$\sum_{m=1}^{\infty} \left(\frac{1}{2}\right)^m N \times 10 = 10N \qquad (12)$$

Note that this value considerably depends on a set of words to be recognized and largely varies depending on $r_b$ in expression (9). For this reason, the value is used as one criteria.

<Estimation of Arithmetic Operation Amount>

An arithmetic operation amount in the recognizing process using the search tree is estimated in advance. It is assumed that a search tree supposed in the estimation of memory capacity described above is obtained. More specifically, it is assumed that the number of all words is represented by N, that the words are degenerated into groups whose number is ½ the number of words in each hierarchy, and that the average number of elements of each group is set to be 10. In this case, the number of words in initial searching in the recognizing process is given by:

$$(\tfrac{1}{2})^M N \qquad (13)$$

of words in structural searching is given by:

$$\sum_{m=1}^{M} (p \times 10) = 10pM \qquad (14)$$

where M is a hierarchy in which initial searching is performed in the recognizing process, and p is the number of words extracted on the mth hierarchy and having higher scores.

As a reference, in recognition of 1,000 words and 4,000 words, values obtained by estimating the number of words whose scores must be calculated when p=10, i.e., the number of words in initial searching and the number of words in structural searching are shown in Table 1 and Table 2:

TABLE 1

| M | Initial Searching | Structural Searching | Total |
|---|---|---|---|
| 0 | 1000 | 0 | 1000 |
| 1 | 500 | 100 | 600 |
| 2 | 250 | 200 | 450 |

TABLE 2

| M | Initial Searching | Structural Searching | Total |
|---|---|---|---|
| 0 | 4000 | 0 | 4000 |
| 1 | 2000 | 100 | 2100 |
| 2 | 1000 | 200 | 1200 |
| 3 | 500 | 300 | 800 |
| 4 | 250 | 400 | 650 |

In each table, the number of words in initial searching for the Mth hierarchy in initial searching, the numbers of words in structural searching, and the total numbers of words, i.e., the numbers of words whose scores are finally calculated. In this case, M=0 corresponding to all searching. As a reduction of an arithmetic operation amount by structuring, in recognition of 1,000 words shown in Table 1, when it is assumed that the sixth hierarchy is used as a hierarchy for initial searching, the scores of 250 words are calculated in initial searching, and the scores of 200 words are calculated in structural searching. As a result, the scores of a total of 450 words are calculated, and it is supposed that the number of words whose scores must be calculated is decreased by about 60%. In 400 words shown in Table 2, when the fourth hierarchy is considered as a hierarchy for initial searching, the scores of 250 words are calculated in initial searching, and the scores of 400 words are calculated in structural searching. As a result, the scores of a total of 650 words are calculated, and it is supposed that the number of words whose scores must be calculated is decreased by about 80%.

In addition, the scores of the words can be prevented from being repetitively calculated such that the scores of typical words whose scores have been calculated can be prevented from being calculated, or the scores of words which are repetitively included in two or more extracted groups can be prevented from being calculated. For this reason, it is expected that the arithmetic operation amount can be further reduced.

When a recognizing process using such a search tree is to be performed, in addition to score calculation, a process of extracting words whose scores are calculated in structural searching must be calculated is performed. Since it is supposed that the arithmetic operation amount in this process is smaller than the arithmetic operation amount in score calculation, the process is not considered.

<Simulation Result>

A result obtained by actually comparing entire searching with searching using structuring of the present invention in recognition of 938 words will be described below. As a method of structuring, expression (7) was used to perform grouping. Grouping was performed while r was increased from 2 to 8 and while $r_j$ was varied by expression (8) described above. In order to perform adding to groups, $r_b$=20 was used in expression (9) described above. The Mth (M=2) hierarchy was structured. As a result, a search tree, having two hierarchies having 150 words in initial searching, in which the average number of paths connected from a certain word of a given hierarchy to words of a hierarchy which was under the given hierarchy was set to be 12 could be obtained.

In recognition by entire searching, a recognition rate was 98.7%, and the number of words whose scores were calculated was 938. In contrast to this, a recognition process using structuring for extracting p (p=8) words having higher scores on each hierarchy was performed. As a result, a recognition rate slightly decreased, i.e., 96.6%, and the number of words whose scores were calculated was a total of 285 words (average), i.e., 150 words in initial searching and 135 words in structural searching. More specifically, it was understood that a calculation amount in searching of the present invention could be reduced by about 70%.

As described above, according to the first embodiment of the present invention, words to be recognized are structured in a tree structure in advance, and searching is performed according to this structure. For this reason, the number of words to be recognized can be limited, and an arithmetic operation amount can be considerably reduced. In addition, when a correlation value $R(W_j, W_i)$ between new words is defined, and a method of structuring the recognition words on the basis of the correlation value is used, words whose scores are expected to be high are included in a searching range even if local searching is performed. Finally, distortion is rarely increased. More specifically, a recognition rate is rarely decreased. In addition, only path information whose amount is about 10 times the number of words is prepared as a memory capacity which is excessively required, and the memory capacity is relatively small.

B. Second Embodiment

As the second embodiment of the present invention, a case wherein the present invention is applied to voice recognition using an HMM (Hidden Markov Model) will be described below.

In the first embodiment described above, a drawback that voice data must be used to calculate correlation values is removed, and the correlation values are directly calculated on the basis of the parameter of the HMM without using voice data. As a matter of course, as in the above embodiment, an arithmetic operation amount can be considerably reduced without a decrease in recognition rate caused by an increase in distortion. In addition, a memory capacity which is excessively required is relatively small.

The voice recognition using the HMM will be briefly described below. As a scheme for making the speed of voice recognition high, definition of correlation values between words, a method of structuring recognition words using the correlation values, and a recognizing method using this structure will be described below.

<Voice Recognition using HMM>

Words to be recognized are represented by $W_1, W_2, \ldots, W_p$. When the feature parameter of an observed voice signal is Y, a probability of setting Y to be a word $W_i$ is given by $P(W_i|Y)$. Therefore, it is preferably determined that $W_i$ which gives the maximum probability in $P(W_i|Y)$ ($i=1, 2, \ldots, p$) is a word to which Y belongs, i.e., that the word $W_i$ is generated. In this case, according to Bayes theorem, $$P(W_i|Y) = P(W_i)P(Y|W_i)/P(Y) \tag{15}$$

is established, and P(Y) of the denominator is independent of $W_i$. For this reason, it is understood that only $W_i$ which maximizes $P(W_i)P(Y|W_i)$ ($i=1, 2, \ldots, p$) of the numerator need be calculated. $P(W_i)$ represents a prior probability of generating the word $W_i$, and $P(Y|W_i)$ represents a probability of obtaining the feature parameter Y when the word $W_i$ is generated.

The HMM method is a method of estimating $W_i$ which maximizes expression (1) by a probability model (HMM).

Figure 12:
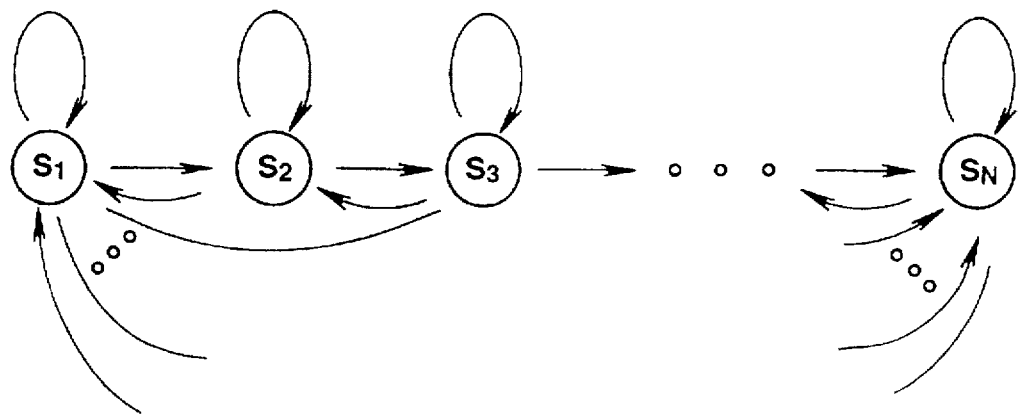
FIG. 12 is a view showing a general state transition model of a hidden Markov model (HMM)

The HMM (Hidden Markov Model) is defined as an automaton in a non-determination finite state, and, as shown in FIG. 12, is constituted by some states $S_1, S_2, \ldots, S_N$ (state number N) and paths representing transition between these states. The transition process in each state is defined as a Markov process, and it is assumed that one output symbol is generated when a state is transits.

Figure 13:
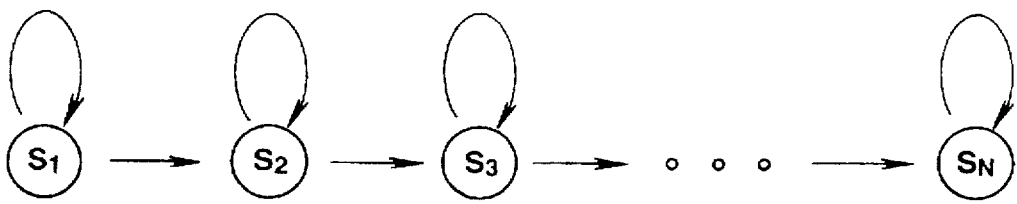
FIG. 13 is a view showing a left-to-right model of the HMM.

In voice recognition, a left-to-right model having an initial state and a final state which allow only self transition and transition to a next state shown in FIG. 13 is often used.

Of HMM methods, in a discrete type HMM method, a probability (posterior probability) of generating a symbol sequence $Y=y_1 \cdot y_2 \ldots y_T$ (T: length of observed sequence) obtained by vector-quantizing, e.g., a voice feature vector in each model is calculated. The model having the highest probability is used as a recognition result.

<Formulation of HMM>

In this case, a discrete type HMN corresponding to a word W is formulated as follows:

S: Finite set of states (N: state number)

$$S=\{S_1, S_2, \ldots, S_N\} \tag{16}$$

V: Set of output symbols (M: output symbol number)

$$V=\{v_1, v_2, \ldots, v_M\} \tag{17}$$

A: Set of state transition probability ($a_{ij}$: transition probability from state $S_i$ to state $S_j$)

$$A=\{a_{ij}\}, \sum_{j=1}^{N} a_{ij} = 1 \tag{18}$$

B: Set of output probabilities in state transition ($b_{ij}(v_k)$: probability of outputting symbol $v_k$ in transition from state $S_i$ to state $S_j$)

$$B=\{b_{ij}(v_k)\}, \sum_{k=1}^{N} b_{ij}(v_k) = 1 \tag{19}$$

$\pi$: Set of initial state probabilities ($\pi_i$: probability of setting initial state $S_i$)

$$\pi=\{\pi_i\}, \sum_{i=1}^{N} \pi_i = 1 \tag{20}$$

On the basis of HMM defined as described above, the symbol sequence $Y=y_1 \cdot y_2 \ldots y_T$ is generated as follows.

Procedure 1. An initial state $x_0=S_i$ is selected according to the initial state probability $\pi$.

Procedure 2. t=0 is set.

Procedure 3. Transition from a state $x_t=S_i$ to a state $x_{t+1}=S_j$ is selected according to a state transition probability $a_{ij}$.

Procedure 4. A symbol $y_t=v_k$ output in transition from the state $S_i$ to the state $S_j$ is selected according to the output symbol probability $b_{ji}(v_k)$.

Procedure 5: When t<T, t=t+1 is set, and return to the procedure 3.; otherwise, the operation is ended.

It is assumed that time in state transition is set to be t=0, 1, 2, ..., and that a transition state at time t is represented by $x_t$.

As described above, in order to define the HMM, designation of N and M, a set of output symbols, and probabilities A, B, and $\pi$ are required. In order to easily express these values, the following expression is defined:

$$\lambda=\{A,B,\pi\} \tag{21}$$

More specifically, a model is determined for each word.

<Probability Calculation of HMM>

In voice recognition, as described above, a left-to-right model in which one initial state and one finial state are defined is often used. In the following description, a model in which initial and final states are limited to $S_i$ and $S_N$ is considered.

It is assumed that a model $\lambda$ outputs a symbol sequence $y_1 \cdot y_2 \ldots y_T$, and that a forward predicted probability that the state $S_i$ is set at time t is represented by $\alpha_i(t)$. In this case, according to definition of the symbol outputs of the above model, the probability $\alpha_N(t)$ can be calculated by the following recurrence formula:

When t=0, $$\begin{cases} \alpha_1(0) = 1 \\ \alpha_i(0) = 0 \quad (i=2, 3, \ldots, N) \end{cases} \tag{22}$$

When t=1, 2, ..., T, $$\alpha_i(t) = \sum_j \alpha_j(t-1) a_{ji} b_{ji}(y_t) \tag{23}$$

In this case, it is assumed that summation with respect to $j$ the above formula is performed only when a given model is allowed to perform transition from the state $S_j$ to the state $S_i$.

On the basis of the above conditions, a probability $P(Y|\lambda)$ of outputting the symbol sequence $Y=y_1 \cdot y_2 \ldots y_T$ from the symbol $\lambda$ is calculated by:

$$P(Y|\lambda)=\alpha_N(T) \tag{24}$$

In the voice recognition using the HMM method, with respect to the symbol sequence $Y=y_1 \cdot y_2 \ldots y_T$ generated by voice, the model $\lambda$ which maximizes the probability $P(Y|\lambda)$ calculated by the above expression is obtained as a recognition result.

As another method of calculating the probability $P(Y|\lambda)$, a calculating method using Viterbi algorithm is used. This calculating method will be briefly described below. A probability $\tilde{\alpha}_i(t)$ that the state $S_i$ is set at time t is calculated by the following expression in place of expression (23):

$$\tilde{\alpha}_i(t) = \max_j \{\tilde{\alpha}_j(t-1)\alpha_{ji}b_{ji}(y_t)\} \quad (25)$$

In this case, it is assumed that the maximum value of $\{\}$ related to $j$ in expression (25) is considered with respect to only a model which is allowed to perform transition from the state $S_j$ to the state $S_i$. On the basis of the probability $\tilde{\alpha}_i(t)$, the following calculation is performed:

$$P(Y|\lambda) = \tilde{\alpha}_N(T) \quad (26)$$

In this case, as a state transition sequence determined by expression (25), a state transition sequence having a final state $S_N$ is uniquely determined, and is called an optimum path. This optimum path can be obtained by the following manner. That is, in calculation of expression (25) of the Viterbi algorithm, when a prior state obtained by transition at this time is stored, and calculation for the final state is completed, the prior state is followed from the final state.

When $\log P(Y|\lambda)$ is calculated, multiplication can be replaced with adding, calculation efficiency can be improved.

<Parameter Estimation of HMM>

A method of estimating a transition probability $A=\{\alpha_{ij}\}$ and an output probability $B=\{b_{ij}(v_k)\}$ as parameters of a model which maximizes the probability $P(Y|\lambda)$ with respect to the symbol sequence $Y=y_1 \cdot y_2 \ldots y_T$ will be described below.

Note that predetermined initial values are used as a transition probability $A=\{\alpha_{ij}\}$ and an output probability $B=\{b_{ij}(v_k)\}$ in the first estimation.

In learning of a model, the forward predicted probability $\alpha_i(t)$ is calculated on the basis of a symbol sequence, and a backward predicted probability $\beta_i(t)$ that the state $S_i$ is set at time t, and, subsequently, a symbol sequence $y_{t+1} \cdot y_{t+2} \ldots y_T$ is output is calculated by the following expressions:

Procedure 1. When $t=T$, $$\beta_i(T)=0 \quad (i=1,2,\ldots,N-1)$$

$$\beta_N(T)=1 \quad (27)$$

Procedure 2. When $t=T-1, T-2, \ldots, 0$, $$\beta_i(t) = \sum_j \beta_j(t+1)a_{ij}b_{ij}(y_{t+1}) \quad (28)$$

In this case, it is assumed that summation related to expression (28) is performed only when a given model is allowed to perform transition from the state $S_i$ to the state $S_j$.

At this time, when a probability that the transition from the state $S_i$ to the state $S_j$ occurs at time t with respect to the symbol sequence $Y=y_1 \cdot y_2 \ldots y_T$ is represented by $\gamma_{ij}(t)$, $\gamma_{ij}(t)$ is given by:

$$\gamma_{ij}(t) = \frac{\alpha_i(t-1)a_{ij}b_{ij}(y_t)\beta_j(t)}{\alpha_N(T)} \quad (29)$$

According to the following expressions, the transition probability $a_{ij}$ and the output probability $b_{ij}(v_k)$ serving as parameters of the model are updated, i.e., learned.

$$\hat{a}_{ij} = \frac{\sum_{t=1}^{T} \gamma_{ij}(t)}{\sum_{t=1}^{T} \sum_h \gamma_{ih}(t)} \quad (30)$$

$$\hat{b}_{ij}(v_k) = \frac{\sum_{t:y_t=v_k} \gamma_{ij}(t)}{\sum_{t=1}^{T} \gamma_{ij}(t)} \quad (31)$$

In the above expressions, $a_{ij}$ having and $b_{ij}(v_c)$ mean a transition probability and an output probability which are updated, i.e., re-estimated, respectively. Summation related to h in the above expression is performed only when the model is allowed to perform the transition from the state $S_i$ to the state $S_j$. Summation related to $t:y_t=v_k$ is performed only when the symbol $y_t=v_k$ is generated at time t.

According to the above expressions, the transition probability $a_{ij}$ and the output probability $b_{ij}(v_k)$ are updated, i.e., re-estimated, and are locally converged into optimum values, respectively.

The method of updating, i.e., re-estimating, the transition probability $a_{ij}$ and the output probability $b_{ij}(v_k)$ as described above is called a Baum-Welch re-estimating method.

In this case, the transition probability $a_{ij}$ and the output probability $b_{ij}(v_k)$ calculated by expressions (30) and (31) for only one learning symbol sequence. The model which performs learning by using these values outputs one certain symbol sequence at a high probability. However, voice varies depending articulation coupling or speakers. A model which outputs only a single symbol sequence at a high probability cannot cope with this variation.

Therefore, learning of a model $\lambda$ must be performed such that some symbol sequences are output at a high probability. For example, when the qth symbol sequence of Q types of symbol sequences is represented by $Y^q=y_1^q \cdot y_2^q \ldots y_T^q$, leaning of the model $\lambda$ is performed such that the product of probabilities $P(Y^q|\lambda)$ that the symbol sequences $Y^q$ (q=1,2, ..., Q) is maximum.

When the above Baum-Welch re-estimating method is multi-sequentially expanded, the probabilities $(Y^q|\lambda)$ can be recursively calculated. More specifically, when $\alpha_i(t)$, $\beta_i(t)$, and $\gamma_{ij}(t)$ by $Y^q$ are represented by $\alpha_i^q(t)$, $\beta_i^q(t)$, and $\gamma_{ij}^q(t)$, respectively, these values are calculated by the following expressions:

$$\gamma_{ij}^q(t) = \frac{\alpha_i^q(t-1)a_{ij}b_{ij}(y_t^q)\beta_j^q(t)}{\alpha_N^q(T)} \quad (32)$$

$$\hat{a}_{ij} = \frac{\sum_{q=1}^{Q} \sum_{t=1}^{T} \gamma_{ij}^q(t)}{\sum_{q=1}^{Q} \sum_{t=1}^{T} \sum_h \gamma_{ih}^q(t)} \quad (33)$$

$$\hat{b}_{ij}(v_k) = \frac{\sum_{q=1}^{Q} \sum_{t:y_t=v_k} \gamma_{ij}^q(t)}{\sum_{q=1}^{Q} \sum_{t=1}^{T} \gamma_{ij}^q(t)} \quad (34)$$

The transition probability $a_{ij}$ and the output probability $b_{ij}(v_k)$ calculated by expressions (33) and (34) mean that learning is performed to respective models. In past, the HMM method is frequently applied to word recognition. Therefore, it is satisfied that learning of models corresponding to words is performed to respective models.

However, in recent years, recognition of effective voice (e.g., word or sentence) has been generally performed using a phoneme to which a corresponding model is connected. For this reason, connection learning of models must be performed.

In the connection learning of models, on the basis of words registered in a predetermined word dictionary, phonemes or phoneme models are connected to each other. When the resultant models are considered as word models, learning to a symbol sequence $Y^q$ prepared as a symbol sequence for leaning words is performed.

More specifically, when learning is performed for each of W phonemes and phoneme models, the parameters of the wth model (e.g., model w), i.e., a transition probability and an output probability, are represented by $a_{ij}^w$ and $b_{ij}^w(v_k)$, and the states of models (i.e., connection models) obtained by connecting the phonemes or phoneme model to the model w is represented by $S_m$ or $S_n$. When the state of the connection model is changed from $S_m$ to $S_n$, it is represented by $(m \rightarrow n) \epsilon w$ that the state $S_m$ belongs the model w. In this case, the transition probability $a_{ij}$ and output probability $b_{ij}(v_k)$ are updated, i.e., re-estimated, according to the following expressions obtained by modifying expressions (33) and (34):

$$\hat{a}_{ij}^w = \frac{\sum\limits_{m \equiv i, n \equiv j} \sum\limits_{q=1}^{Q} \sum\limits_{t=1}^{T} \gamma_{mn}^q(t)}{\sum\limits_{m \equiv i} \sum\limits_{q=1}^{Q} \sum\limits_{t=1}^{T} \sum\limits_{h:(m \rightarrow h) \epsilon w} \gamma_{mh}^q(t)} \quad (35)$$

$$\hat{b}_{ij}^w(v_k) = \frac{\sum\limits_{m \equiv i, n \equiv j} \sum\limits_{q=1}^{Q} \sum\limits_{y_t = v_k} \gamma_{mn}^q(t)}{\sum\limits_{m \equiv i, n \equiv j} \sum\limits_{q=1}^{Q} \sum\limits_{t=1}^{T} \gamma_{mn}^q(t)} \quad (36)$$

In this case, when a connection model is constituted by a plurality of models w, i.e., when the connection model is constituted by using the model w constituted by three states $S_1$, $S_2$, and $S_3$ twice, the connection model has six states $S_1$, $S_2$, $S_3$, $S_1$, $S_2$, and $S_3$. Therefore, in this case, in the states $S_1$, $S_2$, and $S_3$ of the model w, for example, the first state $S_1$ is the same as the first and fourth states of the states $S_1$, $S_2$, $S_3$, $S_1$, $S_2$, and $S_3$ of the connection model. In this manner, a plurality of states m of the connection model may be the same as one state $S_i$ of the model w.

In expressions (359 and (36), summation (total sum) related to m≡i and n≡j is performed when the states $S_m$ and $S_n$ of the connection model are the same as the states $S_i$ and $S_j$ of the model w. In addition, summation related to m≡i is performed when the state $S_m$ of the connection model is the same as the state $S_i$ of the model w.

Summation related to $h:(m \rightarrow n) \epsilon w$ is performed only when the state $S_m$ of the connection model belongs to the model w when the connection model is allowed to perform transition from the state $S_m$ to the state $S_h$.

In expressions (35) and (36), when a model is connected to the back of the model w, and a state $S_m$ of the connection model becomes the final state ($S_m = S_N$) of the model w, the state $S_n$ which is the transition destination of the state $S_m$ serves as the initial state of the model immediately connected to the back of the model w.

When voice recognition is performed by using the discrete type HMM method described above, by using a learning sequence Y prepared for learning, learning of models, i.e., connection learning, is performed according to expressions (33) and (34) or (35) and (36). As a result, the transition probability $a_{ij}$ and output probability $b_{ij}(v_k)$ of the model $\lambda$ are calculated. In the following description, $a_{ij}^w$ and $b_{ij}^w(v_k)$ in expressions (35) and (36) are represented by $a_{ij}$ and $b_{ij}(v_k)$, respectively, as in expressions (33) and (34).

When a symbol sequence Y is observed from voice in recognition, the probability $P(Y|\lambda)$ that the model $\lambda$ outputs, i.e., generates its symbol sequence is calculated according to expression (23).

The above processes are also performed to models, and, as described above, the model having the highest probability $P(Y|\lambda)$ is obtained as a recognition result.

In the discrete type HMM, as described above, a symbol obtained by performing a vector quantizing process or the like to the feature vector of voice is used in learning or recognition. Therefore, the symbol includes a quantization error. As a result, the recognition rate of the voice is disadvantageously degraded.

A mixed continuous HMM method in which output probabilities $b_{ij}(v_k)$ which are related to a symbol $v_k$ and which are a discrete probability distribution, are changed into a continuous probability distribution is used.

In the mixed continuous HMM method, an HMM has a continuous probability density distribution, i.e., a continuous distribution, and the output probabilities $b_{ij}(v_k)$ in the discrete HMM method is approximated by a mixture of L continuous distributions. More specifically, the output probability $b_{ij}(v_k)$ that the model $\lambda$ generates a feature vector y of voice is calculated by the following expression:

$$b_{ij}(y) = \sum_{l=1}^{L} c_{ijl} b_{ijl}(y) \quad (37)$$

where $c_{ijl}$ is a branch probability which represents the lth (l=1, 2, ..., L) appearance probability; $b_{ijl}(y)$ is a branch density which represents the lth probability density distribution. These values satisfy the following conditions:

$$\sum_{l=1}^{L} c_{ijl} = 1 \quad (38)$$

$$\int b_{ijl}(y) dy = 1 \quad (39)$$

Note that a Gaussian distribution (normal distribution) is generally assumed as the probability density distribution $b_{ijl}(y)$. For this reason, when it is assumed that the probability density distribution $b_{ijl}(y)$ follows an n-dimensional normal distribution having the covariance matrix $\Sigma_{ijl}$ of the output probability $b_{ijl}(y)$ and an average value $\mu_{ijl}$ as parameters, the lth probability density distribution $b_{ijl}(y)$ is given by the following expression:

$$b_{ijl}(y) = \frac{1}{(2\pi)^{\frac{n}{2}} |\Sigma_{ijl}|^{\frac{1}{2}}} \cdot e^{-\frac{1}{2}(y-\mu_{ijl})^T \Sigma_{ijl}^{-1}(y-\mu_{ijl})} \quad (40)$$

In expression (40), T and $-1$ represent transposing and an inverse matrix, respectively. $|\Sigma_{ijl}|$ represents the determinant of the covariance matrix $\Sigma_{ijl}$.

In this case, according to the Baum-Welch re-estimating method, the covariance $\Sigma_{ijl}$ and average value $\mu_{ijl}$ of the an appearance probability $c_{ijl}$ and the probability density distribution $b_{ijl}(y)$ can be calculated, i.e., re-estimated by the following expression. Note that a transition probability $a_{ij}$ can be calculated by expression (35) or (33) described above.

$$\hat{c}_{ijl} = \frac{\sum\limits_{t} \alpha_i(t-1) a_{ij} c_{ijl} b_{ijl}(y_t) \beta_j(t)}{\sum\limits_{t} \alpha_i(t-1) a_{ij} b_{ij}(y_t) \beta_j(t)} \quad (41)$$

$$\hat{\mu}_{ijl} = \frac{\sum_t \alpha i(t-1) a_{ij} c_{ijl} b_{ijl}(y_t) \beta_j(t) y_t}{\sum_t \alpha i(t-1) a_{ij} c_{ijl} b_{ijl}(y_t) \beta_j(t)} \quad (42)$$

$$\hat{\Sigma}_{ijl} = \frac{\sum_t P(Y, h_t = l|\lambda)(y_t - \mu_{ijl})(y_t - \mu_{ijl})^T}{\sum_t P(Y, h_t = l|\lambda)} \quad (43)$$

In the above expressions, $c_{ijl}$, $\Sigma_{ijl}$, and $\mu_{ijl}$ each having represents an updated appearance probability, a covariance matrix, and an average value, respectively.

$P(Y, ht=1|\lambda)$ represents a probability that the model $\lambda$ outputs a feature vector yt at time t from the first distribution when a sequence $Y=y_1 \cdot y_2 \ldots y_T$ of a feature vector y of voice. Note that ht=1 denotes a probability variable representing that the feature vector is output first.

When voice is to be recognized by using a model learned on the basis of the mixed continuous HMM method in which the output probability $b_{ij}(y)$ is approximated by a mixture of L continuous distributions, as in the case wherein the discrete type HMM method is used, the probability $P(Y|\lambda)$ that the model $\lambda$ outputs or generates a feature vector sequence observed (extracted) from voice is calculated by expressions (23) and (24) or expressions (25) and (26) described above.

The probability P is also calculated for models other than the model $\lambda$, and, as described above, a model having the highest probability P is obtained as a recognition result.

In place of the estimating method described above, the following method may be used. An optimum state transition sequence is calculated by a Viterbi algorithm for each of training sample sets $\{y^q\}$ to calculate output vector sets $\{y_{ij}\}$ in transition from the state $S_i$ to $S_j$. The output vector set $\{y_{ij}\}$ is classified into L classes by a clustering method, vector sets in each class is considered as a sampling group to estimate a Gaussian distribution. A branch probability is calculated by a ratio of the number of vectors in the class to the total number of vectors. This operation is repeated until parameters are converged.

A correlation value between words when the HMM method will be described below.

<Voice Recognition>

The arrangement a voice recognizing apparatus using the HMM method described above is shown in FIG. 1 described above or FIG. 10, the arrangement and the function of the apparatus in FIG. 1 are the same as those of the apparatus in FIG. 10.

However, a feature amount required for recognition is extracted from a voice signal input by the acoustic analyzing section 12 in FIG. 1, and proper mapping such as KL conversion or neural network is performed to the obtained feature amount to convert the feature amount into a feature amount having a high depress of separation. The feature amount is transmitted to the recognizing section 13. When the discrete type HMM method is used, the feature amount is transmitted to the recognizing section 13 after vector quantization is performed.

In the recognizing section 13, by using the parameters of a model estimated on the basis of the feature amount which is obtained by acoustically analyzing voice data for learning in advance, a recognizing process is performed to unknown voice data. More specifically, as a learning process, the transition probability $a_{ij}$ and output probability $b_{ij}(v_k)$ ($b_{ij}(y)$ when a continuous HMM is used) of an HMM determined on the basis of learning data in advance, and these values are stored in the parameter storing section 14. In the recognizing process, generation probabilities of models corresponding to words in a given dictionary are calculated for a feature amount obtained by acoustically analyzing an input unknown voice signal, and a word having the highest probability (score) or a plurality of words having upper probabilities are selected as recognition results. The obtained recognition results are transmitted to the output section 15. In the output section 15, the transmitted recognition results are displayed on a screen or output as sound. The output section 15 outputs commands for operating other units by using the recognition results.

In the voice recognizing process described above, score calculation in the recognizing section 13 is performed among all the words in a given dictionary to an input unknown voice signal, i.e., in the set of recognition objective words. In recognition of small vocabulary, the process amount of the score calculation poses no problem. However, in recognition of intermediate or large vocabulary, the process amount of the score calculation poses serious problem.

In order to solve this problem, recognition objective words are structured in advance as described above, and the number of words whose scores are calculated is reduced by using this structure. This is an object of the embodiment of the present invention, and is simply shown in FIG. 2. As described above, words whose scores need not be calculated are removed to reduce the process amount, i.e., arithmetic operation amount, of the recognizing unit.

In order to determine the distribution structure of words suitable for the object, a distance scale to known the relationship among words is required.

In the first embodiment of the present invention, the correlation value between words is defined by the expected value of a generation probability (score) of each model calculated by an actual voice signal. On the basis of the defined correlation value between words, recognition objective words are structured. However, when this scheme is used, actual voice data corresponding to the recognition objective words are required to calculate the distance scale between the words by expression (4). The actual voice data pose a serious problem in formation of a recognizing system having intermediate or large vocabulary.

In the second embodiment of the present invention, a new distance scale between words is introduced in place of expression (4).

<Correlation Value Between Words Using Parameters of HMM Model>

As described in the formulation of the HMM, when a model $\lambda=\{A, B, \pi\}$ is given, a symbol sequence $Y=y_1 \cdot y_2 \ldots y_T$ can be generated according to the parameters of this model. For example, when a discrete HMM is used, the symbol sequence can be generated as follows:

Procedure 1. An initial state $x_0=S_i$ is selected according to the initial state probability $\pi$.

Procedure 2. t=0 is set.

Procedure 3. Transition from the state $x_t=S_i$ to the state $x_{t+1}=S_j$ is selected according to the state transition probability $a_{ij}$.

Procedure 4. A symbol $y_t=v_k$ output in transition from the state $S_i$ to the state $S_j$ is selected according to the output symbol probability $b_{ij}(v_k)$.

Procedure 5. When t<T, t=t+1 is set, and return to the procedure 3; otherwise, the operation is ended.

When the continuous HMM is used, in place of the procedure 4., the symbol $y_t$ is preferably determined according to the probability density distribution $b_{ij}(y)$ given by expression (37) described above. Time at which state transition is performed is set to be t=0, 1, 2, . . . , and the state obtained by transition at time t is represented by $x_t$.

In particular, when a left-to-right model shown in FIG. 13 is used, the initial and final states are limited to $S_1$ and $S_N$, respectively. When the expected value of the number of times of self-transition in each state is calculated according to the transition probability $a_{ij}$, one state transition sequence $X=x_0, x_1, \ldots x_T$ is determined.

In this case, since a probability of occurrence of transition to the state $S_j$ after self transition is performed n times in the state $S_i$ is given by:

$$a\ ii^n a\ ij=a\ ii^n(1-a\ ii) \qquad (44)$$

the expected value of n is calculated by calculating:

$$E[n] = \sum_{n=0}^{\infty} n a_{ii}^n (1-a_{ii}) \qquad (45)$$

When the expression is calculated, the following expression can be obtained:

$$E[n]=a\ ii/(1-a\ ii) \qquad (46)$$

This expression will be proved. First, $$S = \frac{1}{1-a_{ii}} E[n] = \sum_{n=0}^{\infty} n a_{ii}^n \qquad (47)$$

is set. This expression (47) is multiplied by $a_{ii}$, and the following expression:

$$a_{ii}S = \sum_{n=0}^{\infty} n a_{ii}^{n+1} \qquad (48)$$

is subtracted from expression (47), thereby obtaining the following expression:

$$\begin{aligned}
&= \sum_{n=0}^{\infty} n a_{ii}^n - \sum_{n=0}^{\infty} n a_{ii}^{n+1} \qquad (49)\\
&= \sum_{n=0}^{\infty} n a_{ii}^n - \sum_{k=1}^{\infty} (k-1) a_{ii}^k\\
(1-a_{ii})S &= \sum_{k=1}^{\infty} k a_{ii}^k - \sum_{k=1}^{\infty} (k-1) a_{ii}^k\\
&= \sum_{k=1}^{\infty} a_{ii}^k\\
&= \frac{a_{ii}}{1-a_{ii}}
\end{aligned}$$

Therefore, according to expression (47), the following expression:

$$E[n]=a\ ii/(1-a\ ii) \qquad (50)$$

i.e., expression (46) is obtained.

Therefore, for example, when $a_{ii}=0.5$, $E[n]=1$ is obtained; when $a_{ii}=0.8$, $E[n]=4$ is obtained. In this case, since expression (46) sharply increases when $a_{ii}$ is close to 1, the following upper and lower limits are set to $E[n]$:

$$0 \leq E[n] \leq 3 \qquad (51)$$

for example, approximation described in the following expression:

$$E[n] = \begin{cases} 0 & (0.0 < a_{ii} < 0.4) \\ 1 & (0.4 \leq a_{ii} < 0.6) \\ 2 & (0.6 \leq a_{ii} < 0.8) \\ 3 & (0.8 \leq a_{ii} < 1.0) \end{cases} \qquad (52)$$

may be performed.

On the above calculation, the expected values of the number of times of self-transition is determined. When the expected values are connected to each other, one state transition sequence is determined. When a symbol $v_k$ having the highest output probability $b_{ij}(v_k)$ is output, a corresponding symbol sequence can be obtained.

For example, when the following transition probabilities:

$$a_{11}=0.5, a_{12}=0.5, a_{22}=0.8, a_{23}=0.2, a_{33}=0.3, \qquad (53)$$

are given, if expression (52) is used, the state transition sequence determined as described above is as follows:

$$S_1,S_1,S_2,S_2,S_2,S_2,S_3, \qquad (54)$$

More specifically, the first $S_1$ represents an initial state, and the next $S_1$ represents a state obtained such that self-transition determined by $a_{11}=0.5$ is performed once. Transition from the state $S_1$ to the state $S_2$ occurs, and self-transition is performed three times in the state $S_2$ according to $a_{22}=0.8$. Thereafter, transition from the state $S_2$ to the state $S_3$ occurs. In this manner, the state transition sequence is determined.

According to the state transition sequence according to expression (54), a sequence of symbols $v_k$ which maximize the following expression:

$$b_{11}(vk),b_{11}(vk),b_{12}(vk),b_{22}(vk),b_{22}(vk),b_{22}(vk),b_{22}(vk),b_{23}(vk), \qquad (55)$$

If the continuous HMM is used, by using the output probability obtained by expression (37) in place of $b_{ij}(v_k)$ in expression (55), a sequence of symbols y which maximize the following expression:

$$b_{11}(y),b_{11}(y),b_{12}(y),b_{22}(y),b_{22}(y),b_{22}(y),b_{22}(y),b_{23}(y), \qquad (56)$$

is preferably obtained. In particular, when the branch density $b_{ijl}(y)$ follows the normal distribution represented by expression (40), the symbol y which calculate the average value $\mu_{ijl}$ of the branch density $b_{ijl}(y)$ with respect to 1 having the highest branch probability $c_{ijl}$ may be set.

As described above, one symbol sequence Zi is obtained by a model $\lambda_j=\{A_j,B_j,\pi_j\}$ corresponding to a certain word $W_j$. At this time, a generation probability $P(Z_j|\lambda_i)$ of $Z_j$ with respect to a model $\lambda_i$ is calculated by expressions (23) and (24) or (25) or (26). In consideration of a method of generating $Z_j$, the generation probability $P(Z_j|\lambda_j)$ with respect to the model $\lambda_j$ is expected to be very high.

In this case, it is assumed that a preferable model $\lambda_i$ corresponding to each word, i.e., a model in which the generation probability of a symbol sequence obtained by acoustically analyzing a corresponding voice signal can be obtained. In this case, when a symbol sequence is generated by the model according to the above method, it is expected that the symbol sequence has characteristics similar to the symbol sequence obtained by acoustically analyzing a voice signal obtained by vocalizing the corresponding word.

More specifically, when the model corresponding to a recognition objective word $W_j$ is represented by $\lambda_j$ ($1<j<p$), the symbol sequence is expected to have the following characteristics:

Characteristic 1. The model $\lambda_i$ having the highest generation probability $P(Z_j|\lambda_i)$ with respect to the symbol sequence $Z_j$ generated by the model $\lambda_j$ is the model $\lambda_j$.

Characteristic 2. When the generation probability $P(Z_j|\lambda_i)$ of the symbol sequence $Z_j$ generated by the model $\lambda_j$ according to the above method by using the model $\lambda_i$ whose generation probability $P(Y_j|\lambda_1)$ increases with respect to a symbol sequence $Y_j$ obtained by acoustically analyzing an actual voice signal corresponding to the word $W_j$ is calculated, the generation probability $P(Z_j|\lambda_i)$ similarly increases.

Characteristic 3. When the generation probability $P(Z_j|\lambda_i)$ of the symbol sequence $Z_j$ generated by the model $\lambda_j$ according to the above method by using the model $\lambda_i$ whose generation probability $P(Y_j|\lambda_i)$ decreases with respect to a symbol sequence $Y_j$ obtained by acoustically analyzing an actual voice signal corresponding to the word $W_j$ is calculated, the generation probability $P(Z_j|\lambda_i)$ similarly decreases.

When the symbol sequence obtained as described above, the correlation value between words can be defined as that of the first embodiment.

A model corresponding to each recognition objective word $W_j$ (1<j<p) is represented by $\lambda j$. A symbol sequence generated by the model according to the above method is represented by $Z_j$. At this time, the generation probability of $Z_j$ calculated by the model $\lambda_i$ is defined as a distance scale $D(W_j,W_i)$ of the word $W_i$ with respect to the word $W_j$.

$$D(W_j,W_i) = P(Z_j|\lambda_i) \;(i=1,2,\ldots,p) \quad (57)$$

The generation probability $P(Z_j|\lambda_i)$ is normalized as follows:

$$P(Z_j|\lambda_i) \equiv \frac{P(Z_j|\lambda_i)}{\sum_{j=1}^{p} P(Z_j|\lambda_i)} \quad (58)$$

The correlation value between words is defined on the basis of the distance scale $D(W_j,W_i)$ as in the first embodiment.

More specifically, words $W_i$ (i=1, 2, ..., p) are sequentially arranged from a word which is close to the word $W_1$, i.e., arranged in the order of increasing distance scale $D(W_1,W_i)$. Similarly, the words $W_i$ (i=1, 2, ..., p) are sequentially arranged from a word which is close to the words $W_2, W_3, \ldots, W_p$.

The places of the words $W_i$, i.e., the places of the words $W_i$ arranged from a word close to the words $W_j$, are defined as a correlation value $R(W_j,W_i)$ of the words $W_i$ to the words $W_j$. More specifically, for example, a word $W_i$ which is closest to the words $W_j$ is defined as 1, a word $W_i$ which is secondly close to the words $W_j$ is defined as 2. Similarly, a word $W_i$ which is farthest from the words $W_j$ is defined as p. As a result, the correlation value is set to be an integer number from 1 to p, and it can be considered that the correlation value is inverse proportion to correlation.

In this case, high correlation or a small correlation value $R(W_j,W_i)$ means that the generation probability $P(Y_j^k|\lambda_i)$ obtained by the model $\lambda_i$ of the words $W_i$ are expected to be high with respect to a feature amount $Y_j^k$ calculated by acoustically analyzing an unknown voice signal $X_j^k$ corresponding to the word $W_j$. Low correlation or a large correlation value $R(W_j,W_i)$ means that the generation probability $P(Y_j^k|\lambda_i)$ obtained by the model $\lambda_i$ are expected to be low with respect to the feature amount $Y_j^k$.

Figure 14:
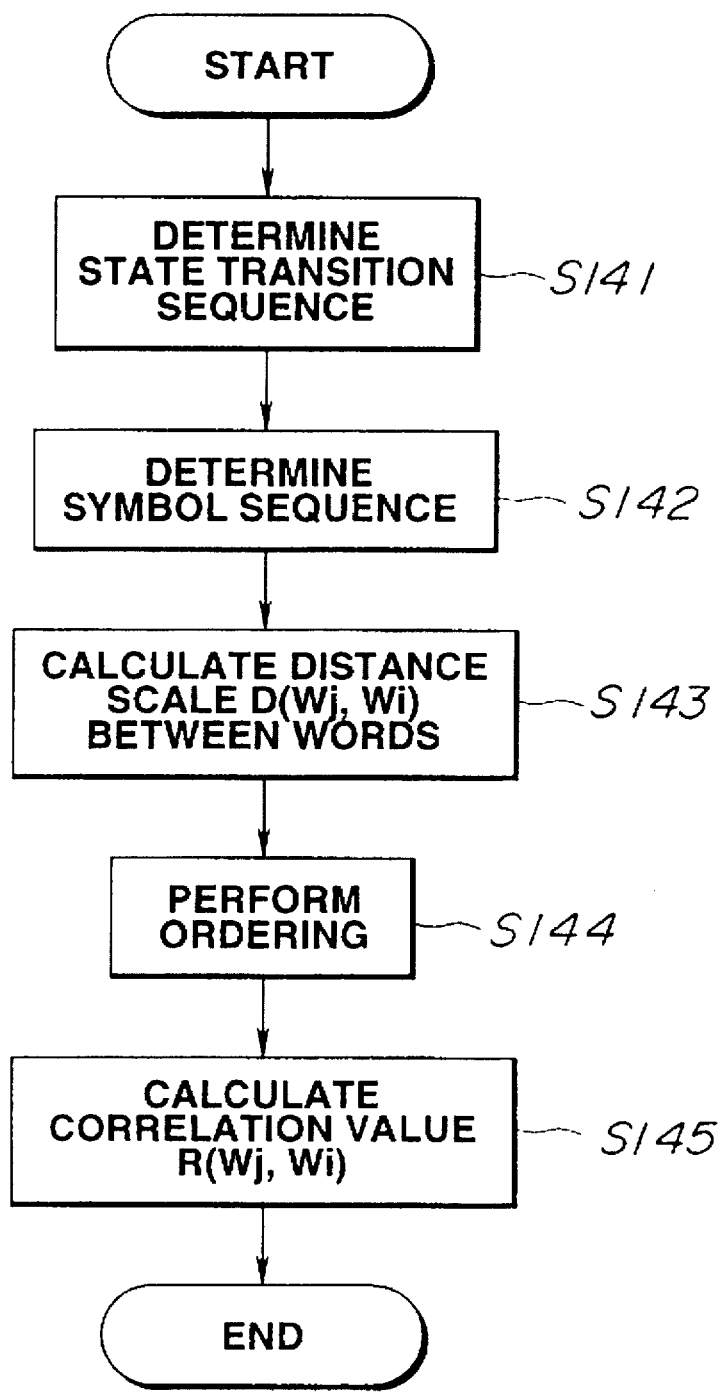
FIG. 14 is a flow chart for explaining a process of calculating a correlation value between words.

The above processes are integrated to obtain FIG. 14. The processes in FIG. 14 will be briefly described below. In step S141, a state transition sequence $X_j$ is determined in the transition probabilities of the models $\lambda_j$ corresponding to the words $W_j$. According to this, in step S142, the symbol sequence $Z_j$ is determined on an output probability. In step S143, a distance scale $D(W_j,W_i)$ is calculated by the generation probabilities of the models $\lambda_i$ corresponding to $Z_j$. In step S144, on the basis of the distance scale $D(W_j,W_i)$, the words $W_i$ are ordered from a word close to the words $W_j$. On the basis of this order, correlation values $R(W_j,W_i)$ are calculated in step S145.

In this case, in the ordering in step S144, if there are words having the same place, the same correlation value is set for these words.

As described above, the following method may also be used. That is, a state transition sequence is determined by using expression (46) or expression (52) described above in step S141. In step S142, a symbol sequence having the highest output probability is not calculated, but random numbers are generated, and, according to a transition probability and an output probability, a symbol sequence is generated with state transition. In this case, since any number of symbol sequences can be generated by the model $\lambda_j$, these sequences are represented by $Z_j^1, Z_j^2, Z_j^3, \ldots$, and, by using the following expression:

$$D(W_j, W_i) \equiv \frac{1}{K} \sum_{k=1}^{K} P(Z_j^k|\lambda_i) \;(i=1,2,\ldots,p) \quad (59)$$

in place of expression (59) described above, the distance scale $D(W_j,W_i)$ of the words $W_i$ with respect to the words $W_j$ is defined.

When the correlation value between words is defined as described above, the correlation value can be calculated by only a model corresponding to a recognition objective word, and data of an actual voice signal corresponding to the recognition objective word is not necessarily required. In particular, when a model corresponding to each recognition objective word is constituted by connecting phoneme models, and actual voice signal data corresponding to the recognition objective word is not used to learn each phoneme model, the above effect can be effected.

<Structuring of Recognition Objective Word>

A method of structuring recognition objective words on the basis of the correlation value obtained by the above method is the same as that in the first embodiment described above, and a description thereof will be omitted.

The score $S(X,W_i)$ described above means a generation probability $P(Y|\lambda_i)$ of a feature amount Y obtained by acoustically analyzing a voice signal X with respect to the model $\lambda_i$.

A recognizing method, estimation of a memory capacity, and estimation of an arithmetic operation amount are the same as those in the first embodiment described above, and a description thereof will be omitted.

<Simulation Result>

A result obtained by actually comparing recognition of 3,265 words performed by entire searching with recognition of 3,265 words performed by searching using the structuring of the present invention will be described below. As a method of structuring, a correlation value was calculated by using expression (57) as a distance scale between words, and the method of structuring used when the structuring of the recognition objective words was described was used. As a result, a search tree having four hierarchies in which the number of words in initial searching was set to be 231 was obtained, and the search tree had 11 (average number) paths which are connected from a certain word on a given hierarchy to words on the hierarchy under the given hierarchy.

By using this search tree, a recognizing process was performed such that the number of words extracted on a certain hierarchy and having high scores. In a recognizing process by entire searching, a recognition rate was 9.02%, and the number of words whose scores were calculated was 3,265. In contrast to this, in a recognizing process using the above search tree, a recognition rate slightly decreased, i.e., 89.9%, and the number of words whose scores were calculated was a total of 508 words (average), i.e., 231 words in initial searching and 276 words in structural searching. More specifically, it was understood that a calculation amount in searching of the present invention could be reduced by about 80% in comparison with entire searching.

According to the second embodiment of the present invention, as in the first embodiment of the present invention described above, an arithmetic operation amount can be considerably reduced by limiting the number of recognition words, words whose scores are expected to be high are included in a searching range even if local searching is performed. Finally, distortion is rarely increased, and a decrease in recognition rate can be prevented.

According to the second embodiment of the present invention, an HMM (Hidden Markov Model) serving as a probability model with respect to voice recognition objective words is prepared, and the correlation values $R(W_j,W_i)$ between words can be calculated by the transition probability $a_{ij}$ and the output probability $b_{ij}(v_k)$ ($b_{ij}(y)$ in continuous HMM) serving as parameters of the model. For this reason, a large amount of actual voice data corresponding to a recognition dictionary is not required, and a search tree can be efficiently obtained.

The present invention is not limited to the embodiments described above. For example, the present invention is applied to a voice recognizing method or apparatus, and the present invention can also be easily applied to a method of forming a dictionary for voice recognition, a recording medium on which a dictionary for voice recognition, or the like. The present invention can be applied to graphic recognition or character recognition other than voice recognition.

According to the present invention, voice recognition objective words are structured into a hierarchical structure or a tree structure which allows overlapping in advance, and the number of recognition words can be limited by searching for words according to the structure, so that an arithmetic operation amount can be considerably reduced. In addition, when a correlation value between new words is defined, and a method of structuring the recognition words on the basis of the correlation value is used, words whose scores are expected to be high are included in a searching range even if local searching is performed. Finally, distortion is rarely increased. More specifically, a recognition rate is rarely decreased. In addition, only path information whose amount is about 10 times the number of words is prepared as a memory capacity which is excessively required, and the memory capacity is relatively small.

The present invention described above can be applied to graphic recognition, character recognition, or the like other than voice recognition. In this case, pattern recognition objects are generally used in place of voice recognition objective words, and these pattern recognition objects are hierarchically arranged into a hierarchical structure or a tree structure which allows overlapping.

An HMM (Hidden Markov Model) serving as a probability model with respect to voice recognition objective words or pattern recognition objects is prepared, and the correlation values between words can be calculated by the parameters of this model. For this reason, a large amount of actual data such as actual voice data corresponding to a recognition dictionary is not required, and a search tree can be efficiently obtained.

What is claimed is:

1. A voice recognizing method, comprising the steps of:
   providing a plurality of voice recognition objective words;
   structuring said voice recognition objective words into a hierarchical structure having a plurality of levels based upon correlation values indicative of similarities between each pair of voice recognition objective words;
   inputting an unknown voice signal;
   accumulating scores for the voice recognition objective words which are related in said hierarchical structure to a voice recognition word in a higher level, which word in said higher level receives a high score for said unknown input voice signal by using parameters which are calculated in advance; and
   extracting and recognizing a corresponding voice recognition objective word to said unknown input voice signal.

2. The voice recognizing method according to claim 1, wherein each pair of voice recognition objective words is arranged within said hierarchy in the order of increasing scores on the basis of values based on expected values of scores calculated by voice data corresponding to the recognition objective words.

3. A voice recognizing method, comprising the steps of:
   providing a plurality of voice recognition objective words;
   structuring said voice recognition objective words into a hierarchical structure by using correlation values between each pair of voice recognition objective words;
   inputting an unknown voice signal;
   accumulating scores for the voice recognition objective words for said unknown input voice signal by using parameters which are calculated in advance;
   extracting and recognizing a corresponding voice recognition objective word to said unknown input voice signal;
   calculating scores for said unknown input voice signal compared to the objective words by calculating scores for voice recognition objective words of a proper, first hierarchy level in the hierarchical structure, calculating scores for words on a next hierarchy level immediately under the first hierarchy level associated with words having high scores in said first hierarchical level, calculating scores for words on a hierarchy level immediately under said next hierarchy level associated with words having high scores in said next hierarchical level, and repeating said score calculating until lowest hierarchy level is reached; and
   selecting at least a word having the highest score from the words whose scores are calculated.

4. The voice recognizing method according to claim 3, further comprising the steps of:
   storing the calculated scores of words; and
   using the stored scores when selecting a word to prevent repetitive score calculation from being performed.

5. The voice recognizing method according to claim 3, further comprising the steps of:
   preparing probability models for the plurality of voice recognition objective words;
   determining a plurality of state transition sequences on the basis of state transition probabilities of probability models corresponding to the voice recognition objective words;
   determining a symbol sequence for each state transition sequence on the basis of an output symbol probability corresponding to the state transition;
   calculating a generation probability of the obtained symbol sequences for probability models corresponding to the voice recognition objective words;
   structuring the voice recognition objective words into a hierarchical structure by using correlation values between each pair of voice recognition objective words based on the generation probability;

generating probabilities of the unknown input voice signal in accordance with the probability models; and selecting a recognized corresponding voice recognition objective word according to the generated probabilities.

6. The voice recognizing method according to claim 5, wherein said plurality of state transition sequences are determined on the basis of the probabilities of the probability models corresponding to the recognition objective words, each said symbol sequence is determined from each state transition sequence on the basis of an output symbol probability corresponding to the state transition, and said generation probabilities of the plurality of obtained symbol sequences are calculated for the models corresponding to the words, further comprising the steps of:

arranging all the voice recognition objective words in the order of increasing expected values of the generation probabilities; and setting the correlation values between the pairs of voice recognition objective words in accordance with the relative positioning of the arranged voice recognition objective words.

7. A method of forming information of pattern recognition objects for recognizing patterns in which scores are accumulated for the pattern recognition objects when compared to an unknown input pattern by using parameters which are calculated in advance, thereby allowing a corresponding pattern recognition object to be recognized, comprising the steps of:

determining correlation values between each pair of recognition objects;

grouping the pattern recognition objects in decreasing order, on the basis of said correlation values;

selecting a pattern recognition object serving as a typical object of a group;

regrouping said pattern recognition objects to form groups each having a relationship between a typical pattern recognition object and a set of pattern recognition objects belonging to the group containing said typical pattern recognition object;

grouping each pattern recognition object which is not selected as a typical object of a group to belong to the group of the typical pattern recognition object having a small correlation value between the typical object and the non-selected object;

grouping the pattern recognition objects obtained by performing the grouping and adding to the groups described above within a group; and repeating these grouping steps a predetermined number of times to structure the pattern recognition objects into a hierarchical structure, said hierarchical structure being formed so that when recognizing an unknown pattern, only pattern recognition objects on a lower level of said hierarchical structure related to a pattern recognition object receiving a high score on a higher level of said hierarchical structure are searched.

8. The information forming method according to claim 7, further comprising the step of grouping said pattern recognition objects, whose correlation values are grouped in decreasing order, whose correlation values are below a predetermined value.

9. The information forming method according to claim 8, wherein said predetermined value is determined in accordance with a state of the grouping.

10. The information forming method according to claim 7, wherein the pattern recognition is voice recognition, and the pattern recognition object is a voice recognition objective word.

11. A voice recognizing apparatus comprising:

means for providing a plurality of voice recognition objective words;

means for structuring said voice recognition objective words into a hierarchical structure having a plurality of levels based upon correlation values indicative of similarities between each pair of voice recognition objective words;

means for inputting an unknown voice signal;

means for accumulating scores for the voice recognition objective words which are related in said hierarchical structure to a voice recognition word in a higher level, which word in said higher level receives a high score for said unknown input voice signal by using parameters which are calculated in advance; and means for extracting and recognizing a corresponding voice recognition objective word to said unknown input voice signal.

12. The voice recognizing apparatus according to claim 11, wherein each pair of voice recognition objective words is arranged within said hierarchy in the order of increasing scores on the basis of values based on expected values of scores calculated by voice data corresponding to the recognition objective words.

13. A voice recognizing apparatus, comprising:

means for providing a plurality of voice recognition objective words;

means for structuring said voice recognition objective words into a hierarchical structure by using correlation values between each pair of voice recognition objective words;

means for inputting an unknown voice signal;

means for accumulating scores for the voice recognition objective words for said unknown input voice signal by using parameters which are calculated in advance;

means for extracting and recognizing a corresponding voice recognition objective word to said unknown input voice signal;

calculating means for calculating scores for said unknown input voice signal compared to the objective words, said calculating means calculating scores for voice recognition objective words of a proper, first hierarchy level in the hierarchical structure, calculating scores for words on a next hierarchy level immediately under the first hierarchy level associated with words having high scores in said first hierarchical level, calculating scores for words on a hierarchy level immediately under said next hierarchy level associated with words having high scores in said next hierarchical level, and repeating said score calculating until lowest hierarchy level is reached; and means for selecting at least a word having the highest score from the words whose scores are calculated.

14. The voice recognizing apparatus according to claim 13, further comprising:

means for storing scores of words; and means for retrieving the stored scores to be used by said calculating means to prevent repetitive score calculation from being performed.

15. The voice recognizing apparatus according to claim 13, further comprising:

means for preparing probability models for the plurality of voice recognition objective words;

means for determining a plurality of state transition sequences on the basis of state transition probabilities of probability models corresponding to the voice recognition objective words;

means for determining a symbol sequence for each state transition sequence on the basis of an output symbol probability corresponding to the state transition;

means for calculating a generation probability of the obtained symbol sequences for probability models corresponding to the voice recognition objective words;

means for structuring the voice recognition objective words into a hierarchical structure by using correlation values between each pair of voice recognition objective words based on the generation probability;

means for generating probabilities of the unknown input voice signal in accordance with the probability models; and means for selecting a recognized corresponding voice recognition objective word according to the generated probabilities.

16. The voice recognizing apparatus according to claim 15, wherein said plurality of state transition sequences are determined on the basis of the probabilities of the probability models corresponding to the recognition objective words, each said symbol sequence is determined from each state transition sequence on the basis of an output symbol probability corresponding to the state transition, and said generation probabilities of the plurality of obtained symbol sequences are calculated for the models corresponding to the words, comprising:

means for arranging all the voice recognition objective words in the order of increasing expected values of the generation probabilities; and means for setting the correlation values between the pairs of voice recognition objective words in accordance with the relative positioning of the arranged voice recognition objective words.

17. A recording medium for recording information thereon, said recording medium having recorded thereon information of pattern recognition objects for use with a computing apparatus, said information of pattern recognition objects allowing said computing apparatus to recognize patterns by accumulating scores for the pattern recognition objects when compared to an unknown input pattern by using parameters which are calculated in advance, thereby allowing a corresponding pattern recognition object to be recognized, wherein said information of pattern recognition objects is determined by:

determining correlation values between each pair of recognition objects;

grouping the pattern recognition objects in decreasing order, on the basis of said correlation values;

selecting a pattern recognition object serving as a typical object of each group;

regrouping said pattern recognition objects to form groups each having a relationship between a typical pattern recognition object and a set of pattern recognition objects belonging to the group containing said typical pattern recognition object;

grouping each pattern recognition object which is not selected as a typical object of a group to belong to the group of the typical pattern recognition object having a small correlation value between the typical object and the non-selected object; and grouping the pattern recognition objects obtained by performing the grouping and adding to the groups described above within a group; and wherein the pattern recognition objects are formed into a hierarchical structure, said hierarchical structure being formed so that when recognizing an unknown pattern, only pattern recognition objects on a lower level of said hierarchical structure related to a pattern recognition object receiving a high score on a higher level of said hierarchical structure are searched.

18. The recording medium according to claim 17, wherein said information of pattern recognition objects is further determined by grouping said pattern recognition objects, whose correlation values are below a predetermined value.

19. The recording medium according to claim 18, wherein said predetermined value is set in accordance with a state of the grouping.

20. The recording medium according to claim 17, wherein the pattern recognition is voice recognition, and the pattern recognition object is a voice recognition objective word.

* * * * *

UNITED STATES PATENT AND TRADEMARK OFFICE
CERTIFICATE OF CORRECTION

PATENT NO. : 5,787,395
DATED : Jul. 28, 1998
INVENTOR(S) : Minamino

It is certified that error appears in the above-identified patent and that said Letters Patent is hereby corrected as shown below:

Title page:
Under [56] "References Cited" please insert:

Bahl, L. R. et al: "A fast approximate acoustic match for large vocabulary speech recognition", proceedings of the European Conference on Speech Communication and Technology (EUROSPEECH), Paris, Sept. 26-28, 1989, vol. 1, 26 Sept. 1989, Tubach, J. P.; Mariani, J. J., pages 156-158.

C.K. Chow: "Adaptive pattern recognition. April 1969.", IBM Technical Disclosure Bulletin, vol. 11, no. 11, April 1969, New York, US, pages 1598-1600.

Li, X. et al: "Image matching with multiple templates", proceedings of the Conference on Computer Vision and Pattern Recognition, Miami Beach, Florida, June 22-26, 1986, 22 June 1986, Institute of Electrical and Electronics Engineers, pages 610-613.

UNITED STATES PATENT AND TRADEMARK OFFICE
CERTIFICATE OF CORRECTION

PATENT NO. : 5,787,395
DATED : Jul. 28, 1998
INVENTOR(S) : Minamino

It is certified that error appears in the above-identified patent and that said Letters Patent is hereby corrected as shown below:

Luo, R. C. et al: "Automated decision tree generation for object recognition and classification", proceedings IECON '86, 1986 International Conference on Industrial Electronics, Control and Instrumentation, Industrial Applications of Mini, Micro and Personal Computers (Cat. No. 86CH2334-1), Milwaukee, WI, USA, 29 Sept.-3 Oct. 1986, 1986, New York, NY, USA, IEEE, USA, pages 357-362, vol. 1.

Yamamoto, S. et al: "Chinese character recognition by hierarchical pattern matching", 1st International Joint Conference on Pattern Recognition, Washington, DC, USA, 30 Oct.-1 Nov. 1973, 1973, New York, NY, USA, IEEE, USA, pages 187-196.

Signed and Sealed this

Tenth Day of November 1998

Attest:

BRUCE LEHMAN

*Attesting Officer*    Commissioner of Patents and Trademarks